(12) United States Patent
Hamada

(10) Patent No.: US 7,254,606 B2
(45) Date of Patent: Aug. 7, 2007

(54) DATA MANAGEMENT METHOD USING NETWORK

(75) Inventor: Masashi Hamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 680 days.

(21) Appl. No.: 10/057,255

(22) Filed: Jan. 24, 2002

(65) Prior Publication Data
US 2002/0103885 A1 Aug. 1, 2002

(30) Foreign Application Priority Data
Jan. 30, 2001 (JP) .......................... 2001-021657
Jun. 26, 2001 (JP) .......................... 2001-193446

(51) Int. Cl.
*G06F 15/16* (2006.01)
*G06F 15/173* (2006.01)

(52) U.S. Cl. ...................... 709/203; 709/223

(58) Field of Classification Search .............. 709/203
See application file for complete search history.

(56) References Cited

U.S. PATENT DOCUMENTS

| | | | | |
|---|---|---|---|---|
| 5,537,533 A | * | 7/1996 | Staheli et al. .................. 714/5 |
| 5,764,903 A | * | 6/1998 | Yu .............................. 709/208 |
| 5,799,147 A | * | 8/1998 | Shannon ........................ 714/6 |
| 5,812,668 A | * | 9/1998 | Weber .......................... 705/79 |
| 5,819,020 A | * | 10/1998 | Beeler, Jr. ..................... 714/5 |
| 5,835,911 A | * | 11/1998 | Nakagawa et al. ......... 707/203 |
| 6,069,941 A | * | 5/2000 | Byrd et al. ............ 379/121.06 |
| 6,289,382 B1 | * | 9/2001 | Bowman-Amuah ......... 709/226 |
| 6,347,384 B1 | * | 2/2002 | Satomi et al. ................ 714/57 |
| 6,629,081 B1 | * | 9/2003 | Cornelius et al. ............. 705/30 |
| 2001/0002485 A1 | * | 5/2001 | Bisbee et al. ................ 713/167 |
| 2001/0047412 A1 | * | 11/2001 | Weinman, Jr. .............. 709/225 |
| 2002/0095487 A1 | * | 7/2002 | Day et al. ................... 709/223 |
| 2002/0103907 A1 | * | 8/2002 | Petersen ..................... 709/226 |

* cited by examiner

*Primary Examiner*—Rupal Dharia
*Assistant Examiner*—Ranodhi Serrao
(74) *Attorney, Agent, or Firm*—Morgan & Finnegan LLP

(57) ABSTRACT

This invention has been made to manage data possessed by a user on a network. One of this invention is a data management method using a network system which includes a server and a client terminal, including the step of making a control server receive a user's data storage request from the client terminal, the step of making the control server select a data server located in an area that has a predetermined relationship with an area set by the user, and the step of making the control server send data associated with the data storage request to the selected data server, and store the data in the selected data server.

30 Claims, 25 Drawing Sheets

FIG. 5

MEMBER PROFILE

| ID NO. | PASSWORD | REGISTERED ADDRESS | | |
|---|---|---|---|---|
| A0001 | aaabaa | Tokyo | ××Ward | ○○ | ×○× |
| A0002 | bbcsed | Saitama | ○×City | ×△ | ○×○ |
| A0003 | gghkdd | Fukuoka | △○City | ×○ | △□× |
| ⋮ | ⋮ | ⋮ | ⋮ | ⋮ | ⋮ |

FIG. 6

DATA SERVER PROFILE

| ADDRESS | AUTHENTICATION PASSWORD | LOCATION | | ADDRESS | |
|---|---|---|---|---|---|
| 103.1.2.10 | abaa | Gunma | ××City | ○○ | ×○× |
| 104.2.1.30 | xxbb | Hokkaido | ○×Ward | ×△ | ○×○ |
| 201.2.1.05 | kkgh | America | △○State | ×○ | △□× |
| ... | ... | ... | ... | ... | ... |

FIG. 7

STORAGE DATA LIST

| ID NO. | FILE NAME | STORAGE DESTINATION SERVER ADDRESS | ENCRYPTION ALGORITHM | ENCRYPTION KEY | STORAGE DATE |
|---|---|---|---|---|---|
| A0001 | picture 1 | 201.2.1.04 | ××× | aba | ××.○.△ |
| | picture 2 | 301.5.3.51 | ○○○ | xcd | |
| | text 1 | 202.1.3.65 | ... | ... | ... |
| | ... | ... | ... | ... | ... |
| | ... | ... | ... | ... | ... |

DATA MANAGEMENT METHOD USING NETWORK

FIELD OF THE INVENTION

The present invention relates to a data management technique and, more particularly, to a technique for managing data possessed by a user using a network.

BACKGROUND OF THE INVENTION

Conventionally, data such as digital photos, video streams, and the like, which are created or acquired by the user, are locally stored in a large-capacity hard disk, DVD, CD-R, or the like of a personal computer or the like of that user, unless he or she wants to open them to the public.

However, when the user acquires large-size data by, e.g., a portable terminal or the like, that data occupies a memory of the portable terminal or the like, and a memory area for storing other data becomes small.

Even when data created by the user is stored in a personal computer or the like, if the location where the personal computer is equipped suffers from disasters such as fire, earthquake, typhoon, and the like, important data may be lost.

SUMMARY OF THE INVENTION

It is a principal object of the present invention to provide a data management technique for appropriately managing data possessed by a user.

According to the present invention, there is provided a data management method using a network system which includes a server and a client terminal, comprising:

the reception step of making the server receive a user's data storage request from the client terminal;

the select step of making the server select a data server located in an area that has a predetermined relationship with an area set by a user; and the storage step of making the server send data associated with the data storage request to the selected data server, and store the data in the selected data server.

According to the present invention, there is also provided a data management method using a network system which includes a server and a client terminal, comprising:

the reception step of making the server receive a user's data storage request from the client terminal;

the select step of making the server select a data server that stores data associated with the data storage request; and the storage step of making the server send data associated with the data storage request to the selected data server, and store the data in the selected data server.

According to the present invention, there is also provided a server comprising:

reception means for receiving a user's data storage request sent from a client;

select means for selecting a data server that stores data associated with the data storage request via a communication line; and means for sending the data associated with the data storage request to the selected data server via the communication line.

According to the present invention, there is also provided a program for making a computer function as:

reception means for receiving a user's data storage request sent from a client via a communication line;

select means for selecting a data server that stores data associated with the data storage request; and means for sending the data associated with the data storage request to the selected data server via the communication line.

According to the present invention, there is also provided a data management system including a control server, a client terminal, and a plurality of data servers, which can communicate with each other via a communication line, the control server comprising:

reception means for receiving a user's data storage request sent from a client;

select means for selecting a data server that stores data associated with the data storage request; and means for sending the data associated with the data storage request to the selected data server, and the data server comprising:

means for storing the data sent from the control server.

According to the present invention, there is also provided a data storage service apparatus which comprises a plurality of servers for storing data in response to a storage request via a network, comprising:

service control means which includes select means for selecting the server in accordance with at least a user's service subscription qualification level, and storage control means for storing data associated with a storage request in the server selected by the select means.

According to the present invention, there is also provided a method of controlling a data storage service apparatus which comprises a plurality of servers for storing data in response to a storage request via a network, comprising:

the service control step which includes the select step of selecting the server in accordance with at least a user's service subscription qualification level, and the storage control step of storing data associated with a storage request in the server selected in the select step.

According to the present invention, there is also provided a data storage service system which comprises a plurality of servers for storing data in response to a storage request via a network, comprising:

service control means which includes select means for selecting the server in accordance with at least a user's service subscription qualification level, and storage control means for storing data associated with a storage request in the server selected by the select means.

According to the present invention, there is also provided a control program executed by a data storage service system which comprises a plurality of servers for storing data in response to a storage request via a network, having contents for:

storing data associated with a storage request in the server selected in correspondence with at least a user's service subscription qualification level.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 shows an example of a member profile;

FIG. 6 shows an example of a data server profile;

FIG. 7 shows an example of a storage data list;

DETAILED DESCRIPTION OF THE PREFERRED EMBODIMENTS

Preferred embodiments of the present invention will now be described in detail in accordance with the accompanying drawings.

Common Embodiment

Figure 1:
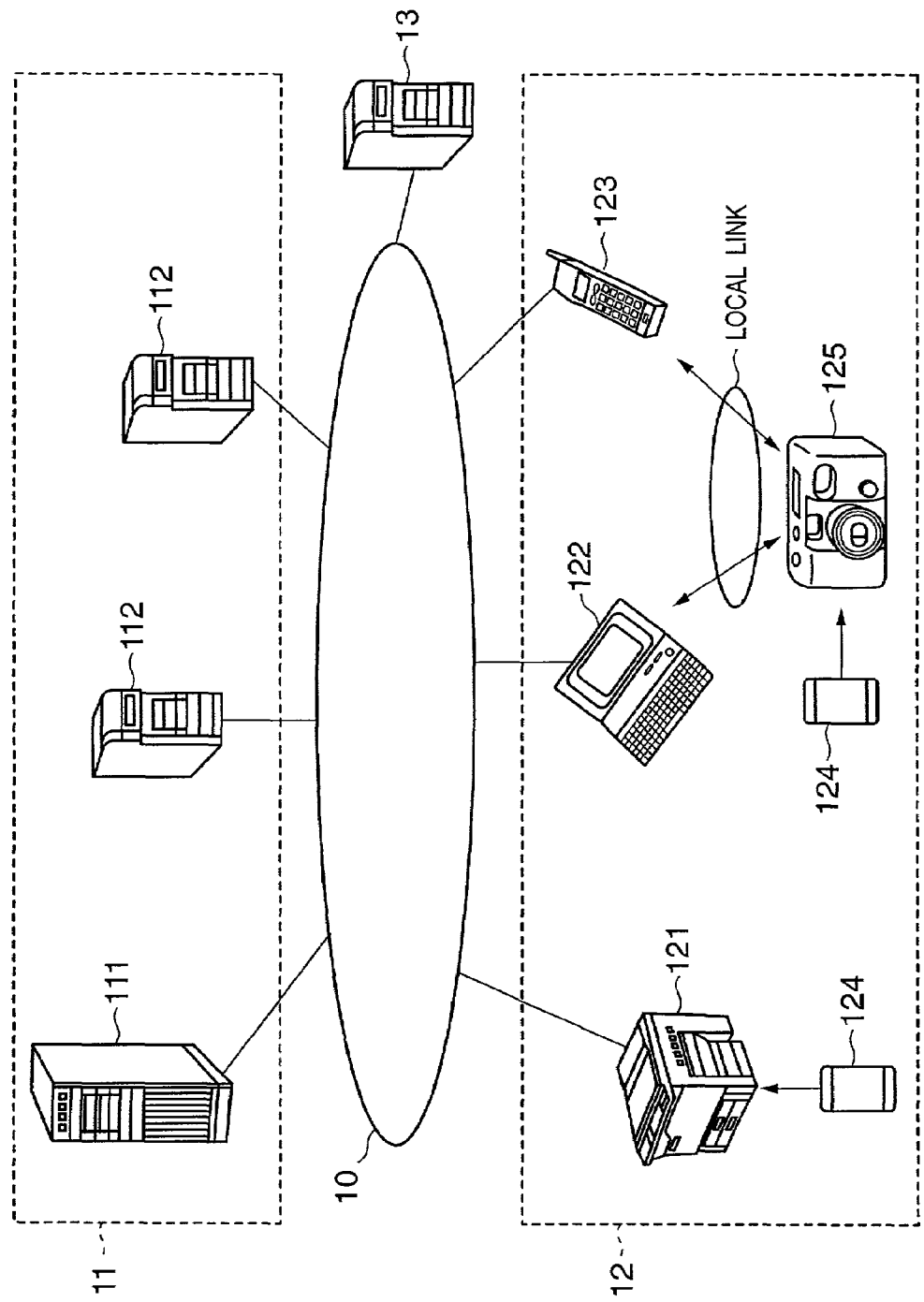
FIG. 1 is a schematic diagram of a network system according to an embodiment of the present invention.

FIG. 1 is a schematic diagram of a network system that can implement data management according to an embodiment of the present invention.

In this network system, an application server group 11 and client terminal group 12 are connected via a network 10 such as the Internet including various kinds of communication lines to be able to communicate with each other. In this embodiment, a disaster information database (server) 13 that provides disaster information is connected to the network 10.

This network system mainly provides a service for managing various data possessed by users (to be also simply referred to as user data hereinafter) by the application server group 11 instead of those users.

The application server group 11 includes a control server 111 that mainly implements a data management service of this embodiment, and a plurality of data servers 112 for storing data possessed by users. FIG. 1 exemplifies only two data servers 112. However, three or more data servers or a single data server may be connected depending on embodiments.

On the other hand, the client terminal group 12 includes a remote printer 121, a personal computer 122 as a wired terminal, and a portable phone 123 as a wireless terminal. A digital camera 125 can be connected to the personal computer 122 or portable phone 123, and data of an image that the user photographs using the digital camera can be submitted onto the network 10. The personal computer 122 and portable phone 123 will be simply referred to as communication terminals 122 and 123 hereinafter.

The control server 111 and data server 112 can comprise versatile server computers.

Figure 8:
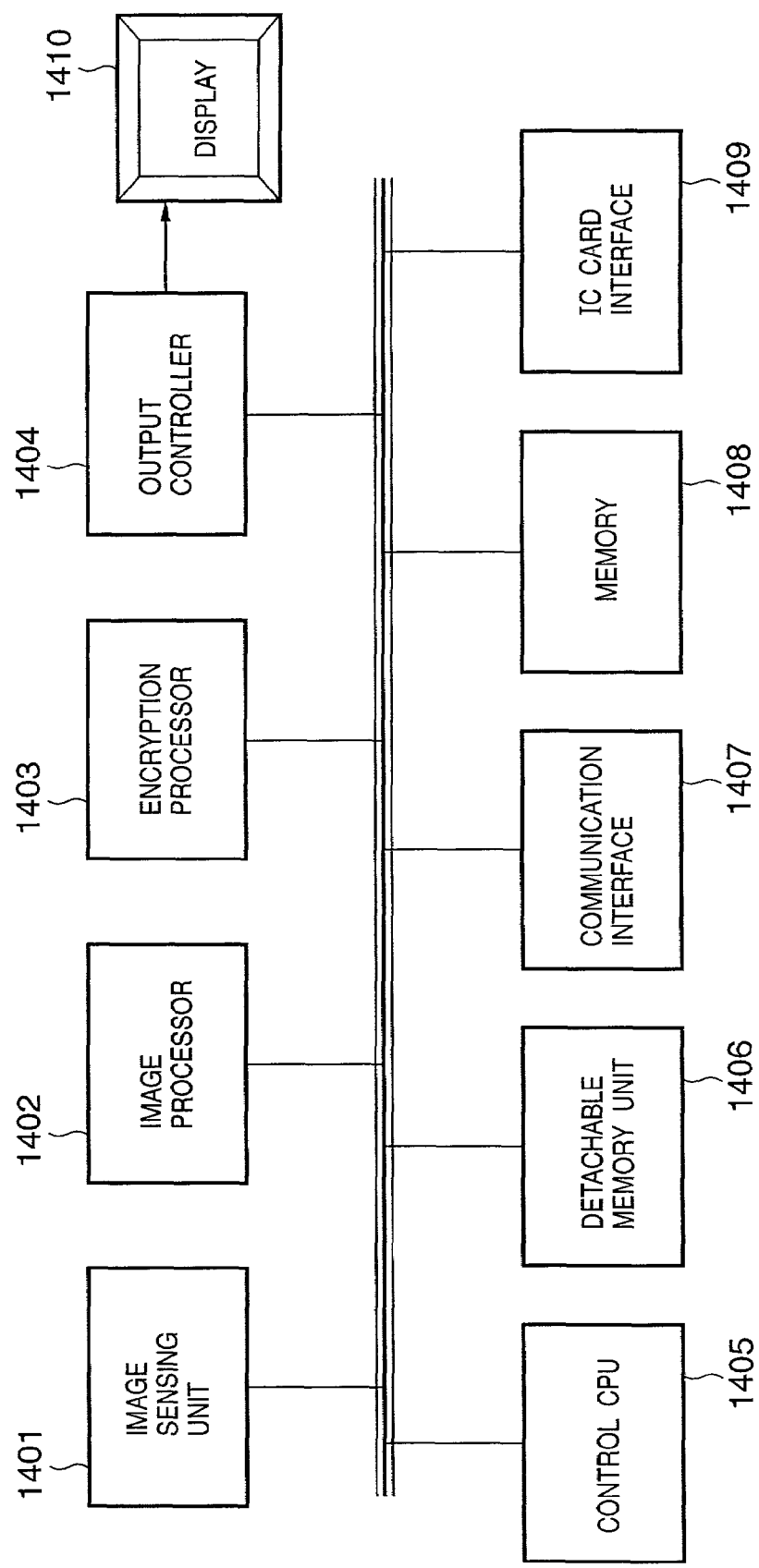
FIG. 8 is a functional block diagram of a digital camera 125.

FIG. 8 is a functional block diagram of the digital camera 125.

The digital camera 125 comprises an image sensing unit 1401, an image processor 1402 for converting an image sensed by the image sensing unit 1401 into data, and an encryption processor 1403 for encrypting/decrypting data based on a predetermined encryption algorithm/encryption key.

The digital camera 125 also comprises an output controller 1404 for converting digital image data into visible image data, a control CPU 1405 for controlling the digital camera 125, and a detachable memory unit 1406 for storing/saving the digital image data.

Furthermore, the digital camera 125 comprises a communication interface 1407 for controlling communications with client terminals such as the personal computer 122 and portable phone 123 in FIG. 1 via local links, a memory 1408 for storing a control program of the digital camera 125, an IC card interface 1409 for controlling communications with an IC card 124 in FIG. 1, and a display 1410 for displaying an image based on visible image data converted by the output controller 1404.

The IC card 124 serves as a user identification module used to identify if the user is an authentic member who can receive the data management service of this embodiment. This embodiment uses the IC card, but other identification modules may be used.

Figure 9:
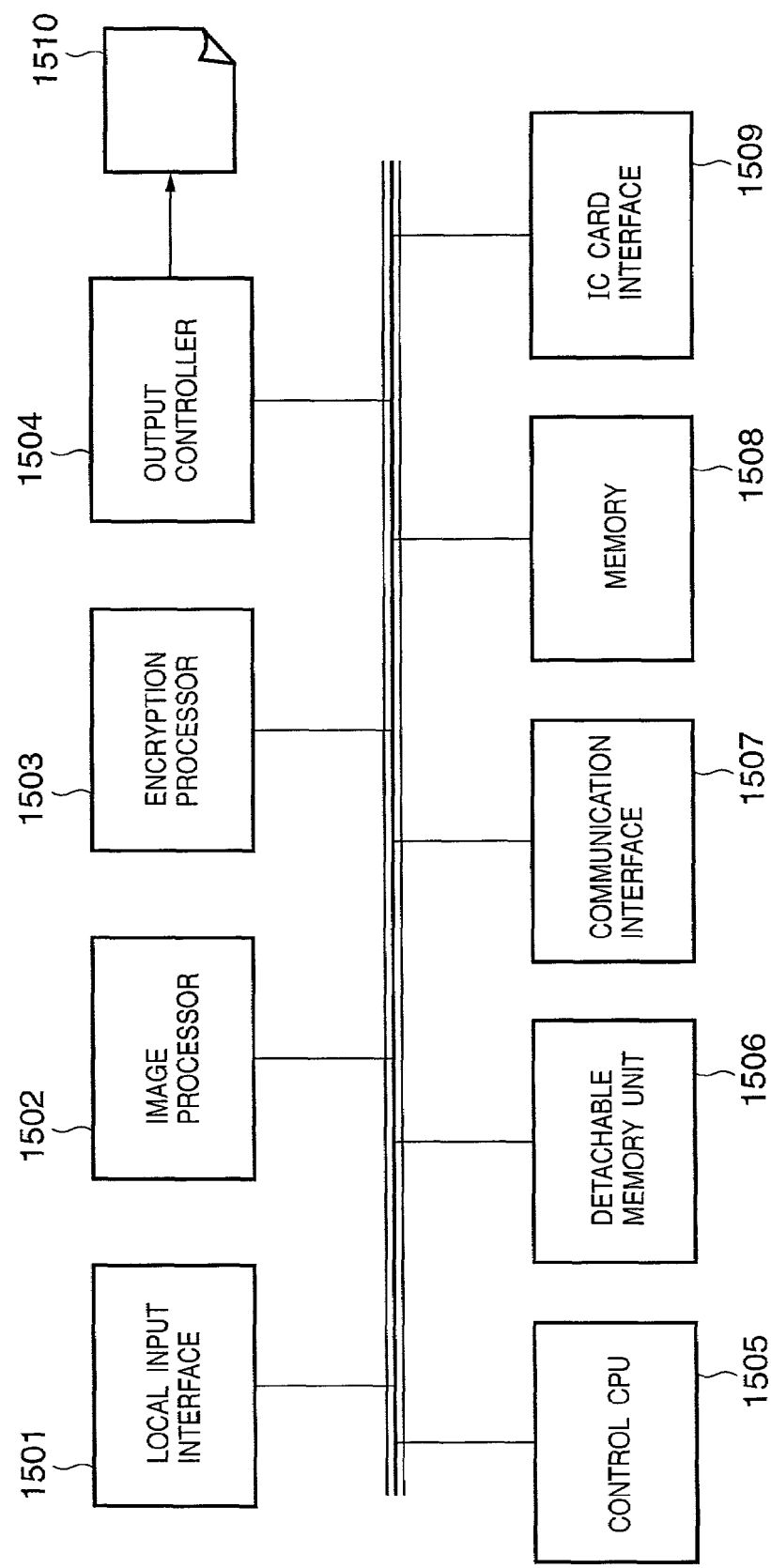
FIG. 9 is a functional block diagram of a remote printer 121.

FIG. 9 is a functional block diagram of the remote printer 121 in FIG. 1.

The remote printer 121 comprises a local input interface 1501 for receiving local image data from a scanner, personal computer, or the like, an image processor 1502 for converting input image data into a predetermined format, an encryption processor 1503 for encrypting/decrypting data based on a predetermined encryption algorithm/encryption key, and an output controller 1504 for converting image data into visible image data, and controlling a printer engine 1510.

The remote printer 121 also comprises a control CPU 1505 for controlling the remote printer 121, a detachable memory unit 1506 for storing/saving digital image data, a communication interface 1507 for controlling communications with the network 10 in FIG. 1, a memory 1508 for storing a control program of the remote printer 121, an IC card interface 1509 for controlling communications with the IC card 124, and the printer engine 1510 for printing under the control of the output controller 1504.

Figure 10:
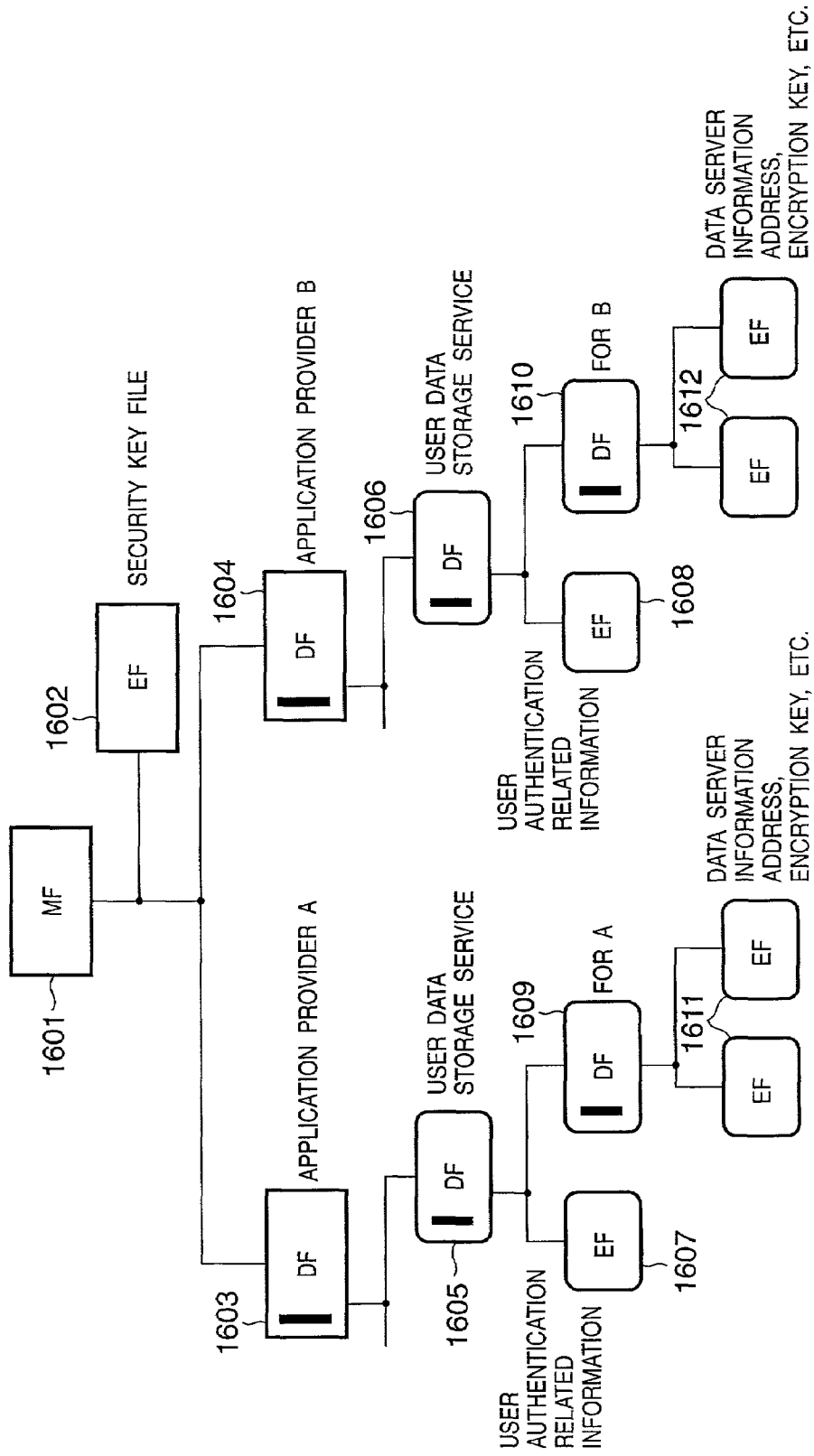
FIG. 10 shows an example of a logical information storage hierarchical model of an IC card 124.

FIG. 10 shows an example of a logical information storage hierarchical model of the IC card 124. This embodiment assumes a smart card with a terminal complying with ISO7816 as the IC card 124.

This hierarchical model includes an MF (Master File) 1601 as the uppermost layer of the logical file structure of the IC card 124, uppermost DFs (Dedicate Files) 1603 and 1604 located immediately below the MF 1601, and an uppermost EF (Elementary File) 1602 as an elementary file that stores information which pertains to the uppermost DFs 1603 and 1604.

This embodiment adopts the following file hierarchical structure. That is, a value unique to each service provider is assigned as an application ID for identification to the uppermost DF (service provider DF), and various kinds of information (in this embodiment, the data storage server address assigned to each user data storage service of a service provider, encryption key information required to decrypt data stored in the data storage server, and the like) used in this application are stored (1607 to 1612) under the DFs (1605, 1606) associated with the user data storage service of this embodiment of those to which application IDs unique to service menu items that the service provider provides are assigned.

In the file hierarchical structure of this embodiment, if a plurality of service providers use a common information format in alliance with each other, a single DF may be prepared as those (1605, 1606) associated with the user data storage service, and a DF to which a single application ID is assigned as the user data storage service may be adopted as the uppermost DF.

Note that the information storage function which is implemented by this IC card 124 and adopts a file hierarchical structure may be directly built in the remote printer 121, personal computer 122, or portable phone 123 without using any IC card 124. With this arrangement, this embodiment can be practiced.

First Embodiment

In the first embodiment of the present invention, the control server 111 executably stores a plurality of different encryption algorithm programs used to encrypt user data, and also stores a member profile, a data server profile, and storage data lists.

The member profile records information that pertains to users (members) who receive the data management service of this embodiment. FIG. 5 shows an example of the member profile. The member profile shown in FIG. 5 records ID Nos. which specify respective members, passwords for member authentication, and members' addresses. The registered addresses are arbitrary set by the members upon member registration, and include a home address, office address, and the like. The user selects a data server in this system in which he or she wants to store data with reference to this registered address. Note that the member profile also records an e-mail address (not shown) and the like of that member.

The data server profile records information associated with the data servers that store user data in this embodiment. FIG. 6 shows an example of the data server profile. The data server profile shown in FIG. 6 records addresses which specify the respective data servers, authentication passwords used to eliminate a fraudulent server (e.g., "pretender"), and location addresses where the data servers are located.

The location addresses are used upon selecting the data server that stores user data.

The storage data list records storage information of user data for respective members. FIG. 7 shows an example of the storage data list. The storage data list records ID Nos. that specify respective members, file names of user data that specify respective user data, storage destination server addresses that specify the data servers which store user data, encryption algorithms and encryption keys as information that pertains to encryption of user data (to be described later), and user data stored dates.

Each data server 112 stores the aforementioned member profile to cope with transmission requests of the stored user data from members. Also, to make authentication with the control server 111, each data server 112 stores authentication passwords stored in the data server profile.

The data management process executed on the system with the above arrangement will be described below.

<Storage of User Data>

Figure 2:
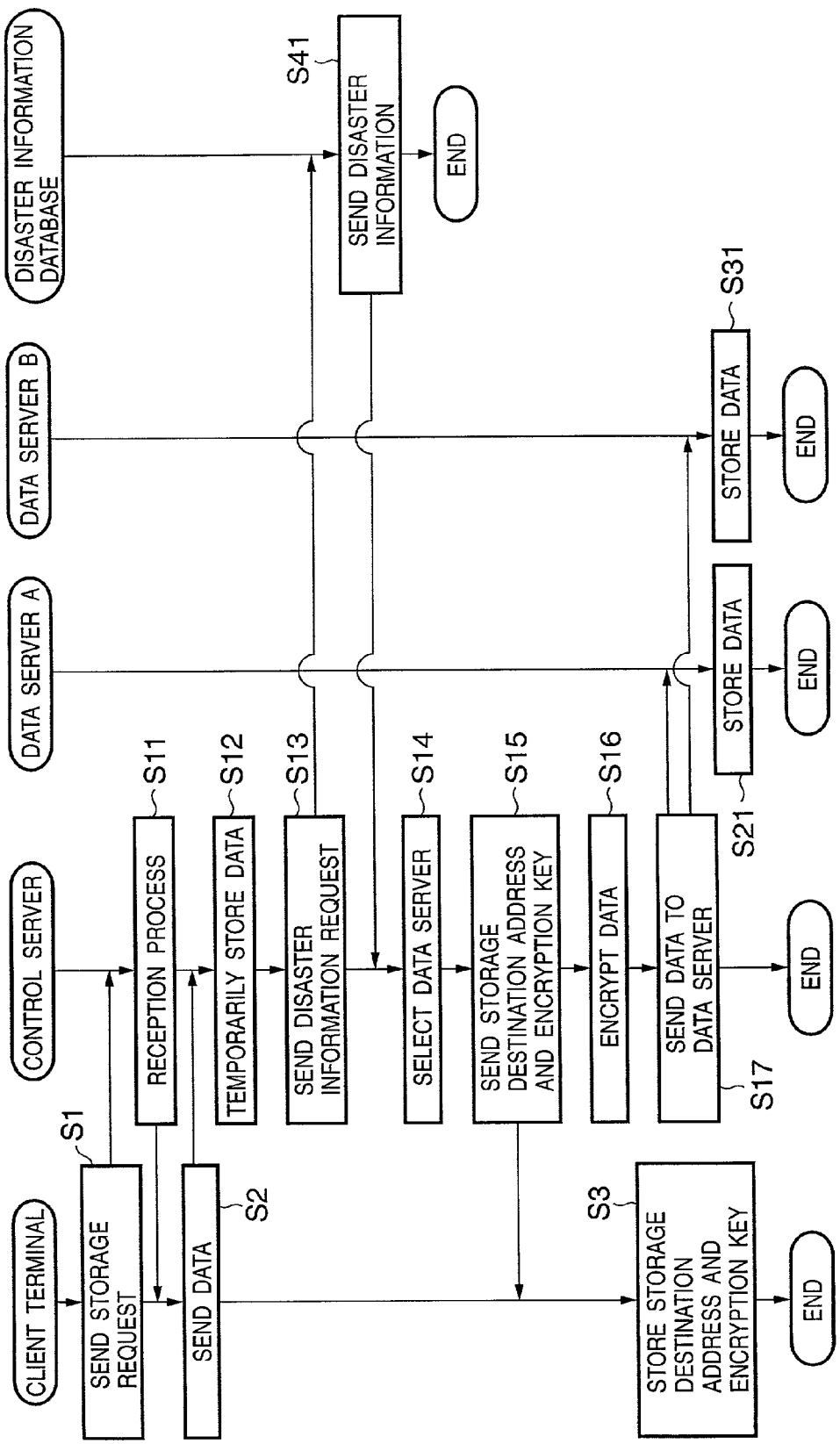
FIG. 2 is a flow chart showing a data storage process executed by the network system shown in FIG. 1 in the first embodiment of the present invention.

A process executed when the user stores image data of an image photographed using the digital camera 125 in the data server 112 via a client terminal (in this case, the portable phone 123) will be explained below. FIG. 2 is a flow chart showing the data storage process.

In step S1, the user accesses the control server 111 via the portable phone 123 to send a storage request of image data photographed by the digital camera 125. In this embodiment, since the data management service is provided to only registered members, the storage request contains a user's ID No. and password, which are used to check if the user is an authentic member. Such information is acquired from the IC card 124.

In step S11, the control server 111 executes a reception process in response to the storage request from the portable phone 123. In this reception process, the control server 111 executes a user authentication process for checking by looking up the member profile shown in FIG. 5 if the storage request was issued by an authentic member. If user authentication has succeeded, transfer of image data that the member requests to store is permitted; if it has failed, the communication with the portable phone 123 is disconnected.

If user authentication has succeeded, image data photographed by the digital camera 125 is sent from the portable phone 123 to the control server 111 in step S2.

In step S12, the control server 111 temporarily stores the received user data. In this case, the control server 111 may check the presence/absence of data errors during transfer by calculating, e.g., the check sum of the received user data, and may request the portable phone 123 to re-send user data upon detecting any data errors.

In step S13, the control server 111 accesses the disaster database 13 to request disaster information. In response to this request, the disaster database 13 sends disaster information to the control server 111 (step S41).

The disaster information contains prediction information of disasters such as typhoon, earthquake, and the like, and the control server 111 checks the predicted disaster rates of occurrence of respective areas. Such predicted disaster rates of occurrence can be acquired from disaster information provided by Japan Meteorological Agency and other private agencies on the network, and rate information for respective areas of nonlife insurance (fire insurance, earthquake insurance) managed by a nonlife insurance company or the like.

In this embodiment, the control server 111 acquires disaster information every time it receives a storage request from a member. Alternatively, the control server 111 may periodically acquire such information, and store the information in the server 111, thus omitting the process in step S13.

In step S14, the control server 111 selects a data server that stores user data from the data servers 112 with reference to the data server profile shown in FIG. 6. In this embodiment, the control server 111 can select two data servers. For this purpose, the control server 111 acquires the registered address of the user (member) who issued the storage request with reference to his or her member profile.

The control server 111 selects one data server located in an area or place such as a prefecture, city, or the like other than the registered address of the user with reference to the data server profile, and sets the selected data server as a data server (A) which serves as a storage destination of the user data. Then, the control server 111 selects one data server present in an area or place, the previously acquired predicted disaster rate of occurrence of which is equal to or smaller than a predetermined threshold value, from all the data servers 112, and sets that selected data server as a data server (B) which serves as another storage destination of the user data.

Note that the control server 111 may access the selected data servers after their selection to authenticate selected data servers A and B with reference to the data server profile to confirm if these data servers are not fraudulent servers such as "pretenders" or the like. As a result of such authentication of the data servers, if the selected data server is a fraudulent server, selection of that data server is canceled, and another data server is selected again. Also, the detected fraudulent server is recorded to lower its priority order upon subsequent selection of data servers. With such server authentication, the reliability of the system and service can be improved.

In this embodiment, since user data, which is encrypted by different methods, is stored in data servers A and B, as will be described later, encryption algorithms/encryption keys used to encrypt/decrypt the user data are determined. In this embodiment, since the user data are stored in the two data servers, two different encryption algorithms are used and two different encryption keys are used, or one encryption algorithm is used and two different encryption keys are used.

In step S15, the control server 111 sends a file name for specifying user data to be stored, the addresses of data servers A and B as storage destinations of the user data, information of the encryption algorithms, encryption keys, and storage conditions to the portable phone 123, and updates the storage data list shown in FIG. 7. Note that the storage conditions may be sent after the user data is stored in the data server.

In step S3, the portable phone 123 stores the storage conditions sent from the control server 111 in the IC card 124 inserted in the digital camera 125. After storage, the communication between the portable phone 123 and control server 111 is disconnected.

In step S16, the control server 111 encrypts the user data. The user data is encrypted using different encryption schemes for data servers A and B in accordance with the encryption algorithms and encryption keys determined in step S14.

In step S17, the control server 111 accesses selected data servers A and B in turn, and sends the encrypted user data to data servers A and B. In steps S21 and S31, data servers A and B store the user data sent from the control server 111. After storage, the processing ends.

As described above, in this embodiment, since data such as image data or the like possessed by the user can be stored in the data servers 112 on the network, such data need not be stored in the user's terminal, and the memory of the user's terminal can be effectively used.

Since user data can be stored in a data server which is located at a place different from the user's registered address or a data server which is located at a place with a low disaster rate of occurrence without requiring the user to make any special operation for designating the data storage location, even when the user at the registered address suffers from disasters, important user data can be protected.

<Acquisition of Stored Data>

Figure 3:
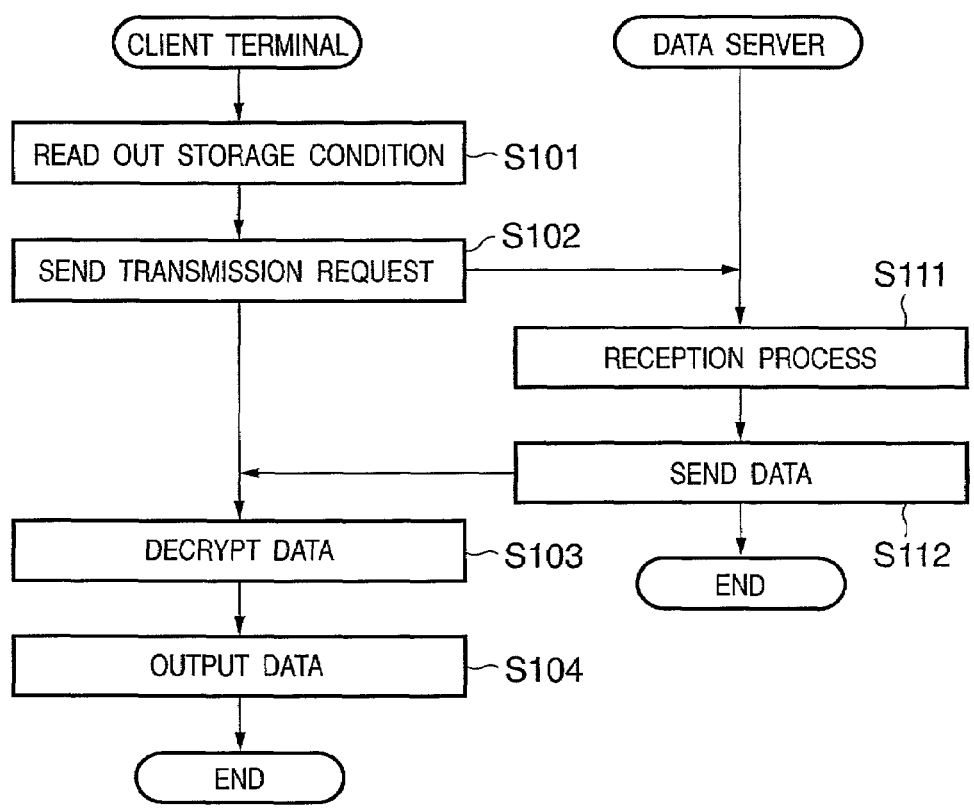
FIG. 3 is a flow chart showing a data acquisition process executed by the network system shown in FIG. 1 in the first embodiment.

A process executed when user data stored in each data server 112 is acquired by the client terminal (remote printer 121 in this case) will be explained below. FIG. 3 is a flow chart showing such data acquisition process. This process starts when the user inserts the IC card 124 in the remote printer 121, and instructs the remote printer 121 to acquire user data that he or she specifies.

In step S101, the remote printer 121 reads out the storage conditions such as the address of the data server 112 that stores the designated user data, encryption key, encryption algorithm information, and the like, the member ID No., and password from the IC card 124. In step S102, the remote printer 121 accesses the data server (112) at the address read out in step S101, and sends a transmission request of user data by designating a file name together with the member ID No. and password read out from the IC card 124.

In step S111, the data server (112) executes a reception process in response to the transmission request from the remote printer 121. In this reception process, the data server (112) executes a user authentication process for checking if the transmission request was issued by an authentic member. If user authentication has succeeded, transfer of the user data designated by the transmission request is permitted; if it has failed, the communication with the remote printer 121 is disconnected. If user authentication has succeeded, the user data is sent from the data server (112) to the remote printer 121 in step S112, and the communication with the remote printer 121 is disconnected. The remote printer 121 receives the user data from the data server (112), and checks authenticity of the transferred user data calculating, e.g., the check sum. Upon detecting any errors, the remote printer 121 may request to re-send the user data.

In step S103, the encryption processor 1504 of the remote printer 121 decrypts the transferred user data using the encryption key and encryption algorithm read out from the IC card 124. In step S104, the remote printer 121 prints out the decrypted user data, thus ending the processing.

In this way, each user can acquire user data stored in the data server 112. In this embodiment, the client terminal directly accesses the data server 112 to send the transmission request of the stored user data. Alternatively, the transmission request of user data may be sent via the control server 111.

<Tampering Check of Stored Data>

In this embodiment, in order to improve the security of user data stored in the data server 112, the control server 111 periodically checks if the stored user data have been tampered with.

Figure 4:
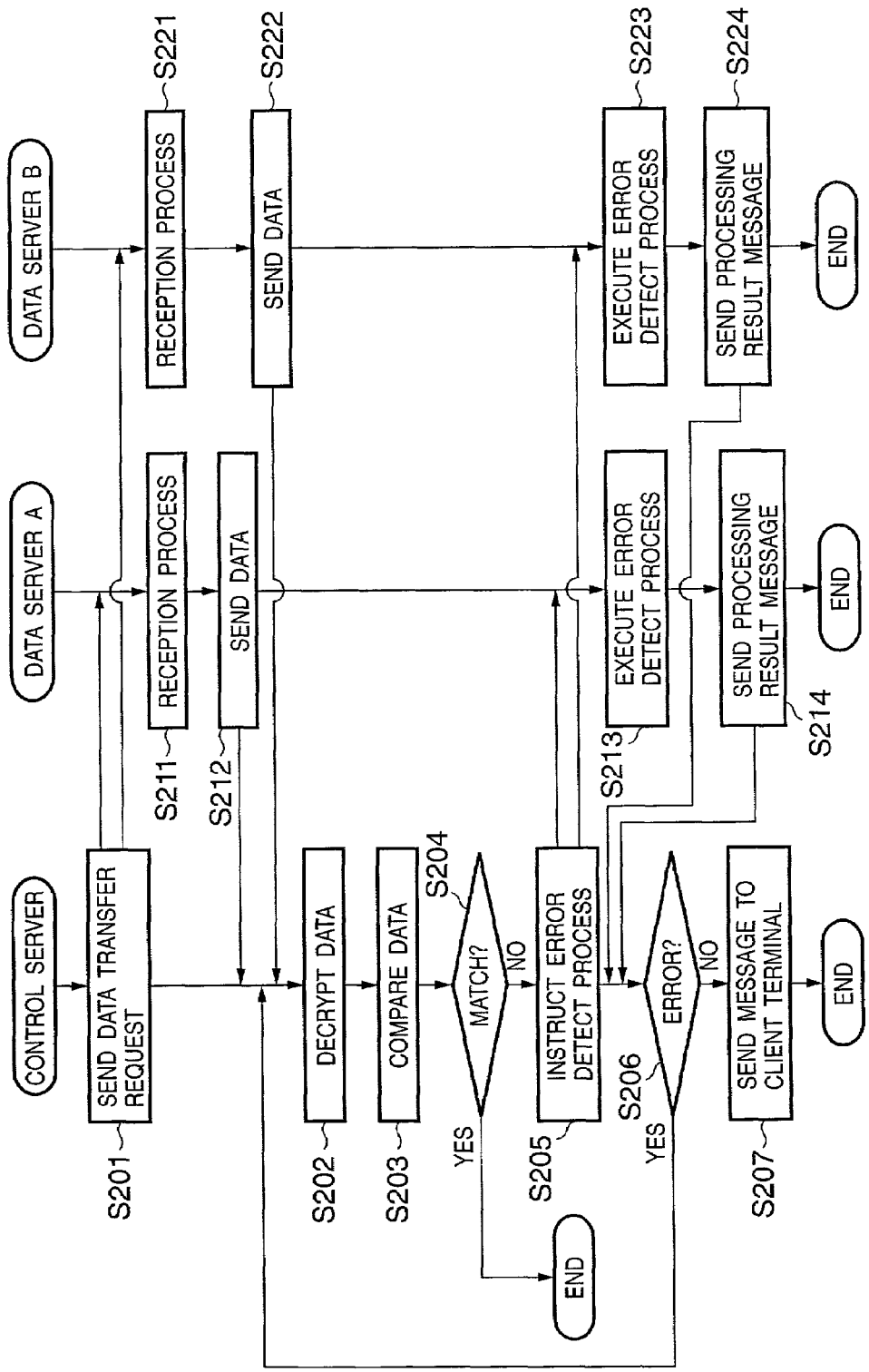
FIG. 4 is a flow chart showing a tampering check process executed by the network system shown in FIG. 1 in the first embodiment.

The control server 111 executes the following process so as to check the storage dates of respective data recorded in the storage data list shown in FIG. 7 periodically (e.g., everyday), and to check for any tampering user data that have passed several days, several weeks, or several months after their storage dates. FIG. 4 is a flow chart showing the tampering check process.

In step S201, the control server 111 accesses data servers A and B that store user data to be checked in turn, and sends transfer requests of user data.

In steps S211 and S221, data servers A and B execute a reception process in response to the transfer requests from the control server 111. In steps S212 and S222, data servers A and B send user data to the control server 111.

In these processes, the control server 111 may authenticate the data servers to confirm if these data servers are not fraudulent servers such as "pretenders" or the like. As a result of such authentication of the data servers, if the selected data server is a fraudulent server, a count that this server is determined as a fraudulent server is recorded, and when that count becomes equal to or larger than a predetermined threshold value, a message indicating this may be sent to the member via the client terminal.

In step S202, the control server 111 decrypts the user data sent from data servers A and B using the encryption algorithms and encryption keys recorded in the storage data list shown in FIG. 7.

In step S203, the control server 111 compares the decrypted user data to check if they match. If the user data match, the processing ends, and the communications with data servers A and B are disconnected. On the other hand, if the user data do not match, the flow advances to step S205 to instruct data servers A and B to execute an error detect process for checking if the transferred data have errors. This is because user data mismatch occurs due to operation errors of the data servers 112 in addition to tampering.

In steps S213 and S223, data servers A and B execute an error detect process in accordance with the instruction from the control server 111. In this embodiment, data servers A and B respectively execute memory scans (local checks) of the memories where the user data are stored to detect any errors, and correct the errors if they are correctable.

In steps S214 and S224, data servers A and B send error detect process results to the control server 111. If any errors are found, corrected user data is sent together.

In step S206, the control server 111 receives the error detect process results from data servers A and B to check if any errors are found. If errors are found, the flow returns to step S202 to execute the aforementioned process using the corrected user data. If no errors are found, it is determined that the user data has been tampered with on data server A or B due to some circumstances, and an e-mail message or the like indicating this is sent to the client terminal of that user (step S207). Also, the tampered portion may be stored in the memory of the control server 111, and may be set to the user according to the user's request.

As described above, since the application control server 111 automatically and periodically checks data authenticity on the data servers 112, jobs required to confirm authenticity (free from tampering) of user data that the members store and save on the data servers 112 can be greatly reduced.

Second Embodiment

In the first embodiment, when data of the users in an area suffering from a disaster are stored in a server with high safety level (against disasters), storage processes are done in the order of storage requests received. For this reason, if a user with high service subscription qualification such as a user who paid a high service subscription fee, who has subscribed to the service for years, and the like issues a storage request behindhand, the server with high safety level has already been full of data at that request timing, and data of such user with high service subscription qualification is stored in only a server with low safety level or that user may not be able to receive any service at all.

In order to solve this problem, the number of servers may be increased. However, when the number of servers is increased, the operating cost of the service provider increases, resulting in poor profit efficiency.

The second embodiment provides an even data storage service without lowering profit efficiency.

A process of the control server 111 done upon receiving a user data storage request from a service subscriber (member) (to be also simply referred to as a user hereinafter) will be described below with reference to FIGS. 11 and 12. Note that a case will be exemplified below wherein the service subscriber stores image data in the digital camera 125 in the data server 112 or 113 via the communication terminal 122 or 123.

Figure 11:
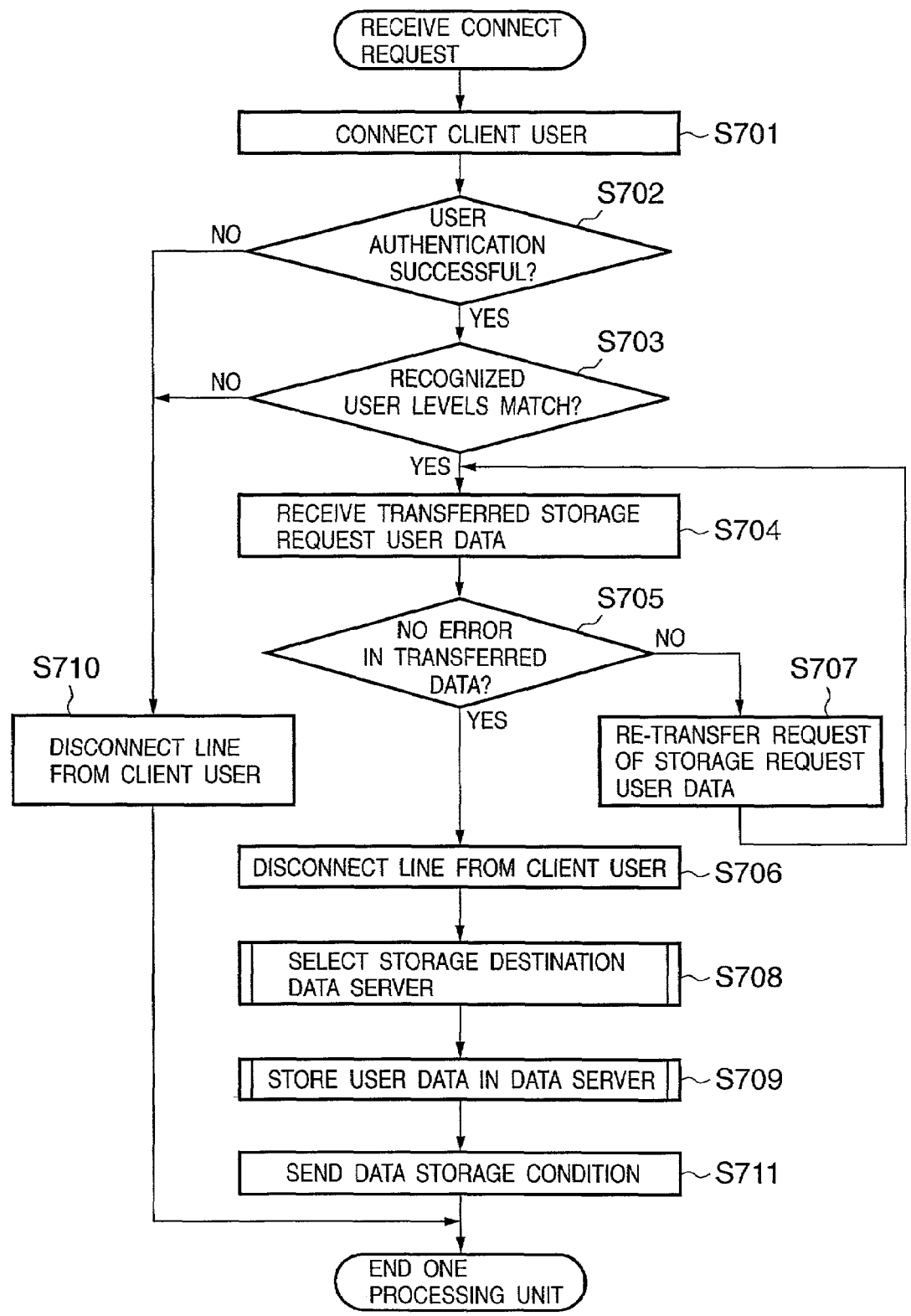
FIG. 11 is a flow chart showing the process of a control server executed upon receiving a connection request (user data storage request) from a client terminal.
Figure 12:
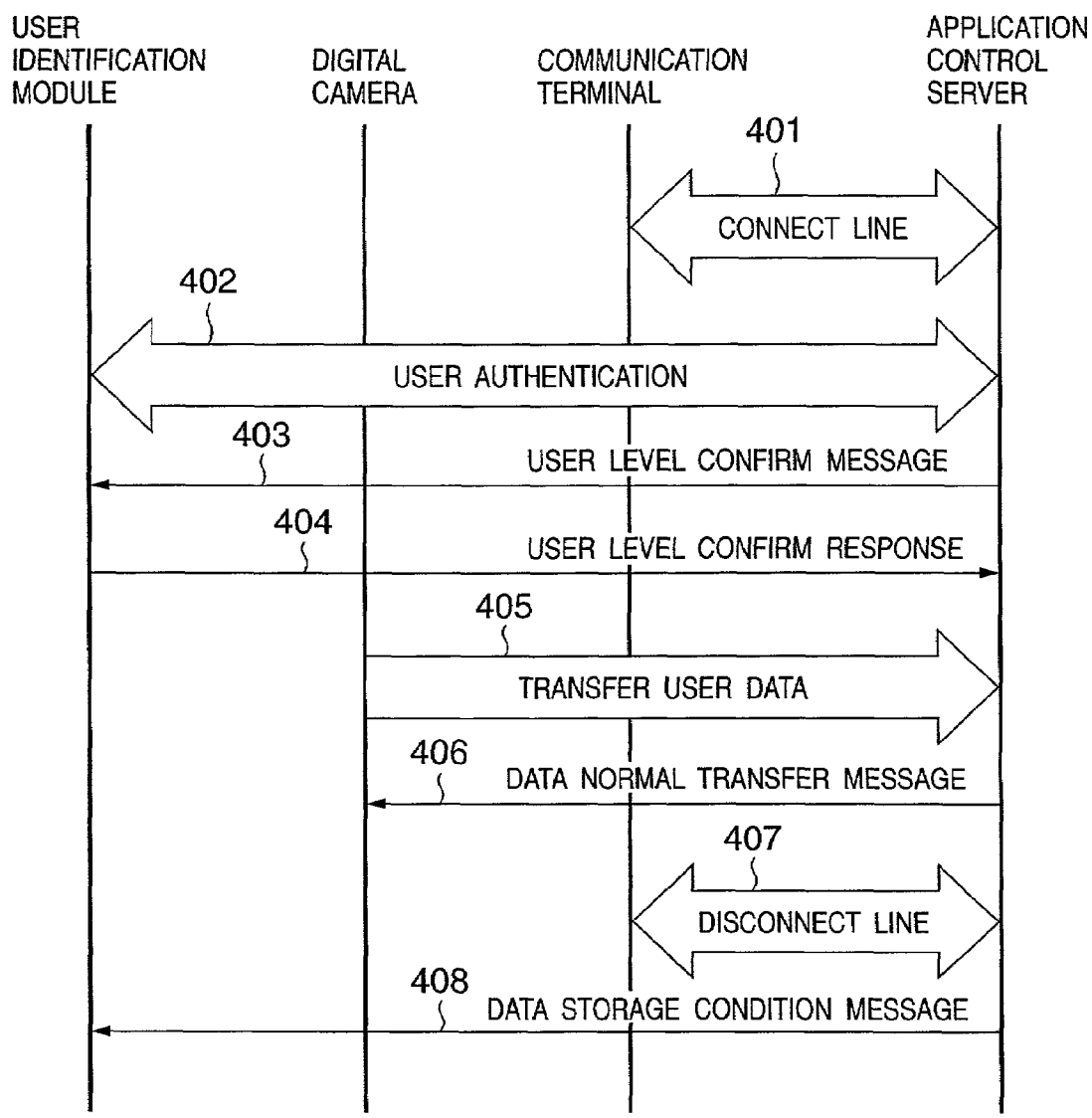
FIG. 12 is a sequence chart showing a communication process executed when a client terminal issued a connection request (user data storage request)

The control server 111 establishes a communication line between the communication terminal 122 or 123 and the control server 111 (step S701 in FIG. 11, 401 in FIG. 12).

A user authentication process is executed between the IC card 124 inserted on the client terminal side (digital camera 125) and the control server 111 so as to check if the operator of the client terminal is an authentic member (402 in FIG. 12, step S702 in FIG. 11).

If user authentication has succeeded, it is checked if the user level recognized on the IC card 124 (application service subscription qualification of the user) matches that recognized on the control server 111 (step S703 in FIG. 11, 403, 404 in FIG. 12).

If both user authentication and user level confirmation have succeeded, transfer of user data corresponding to the storage request is accepted (step S704 in FIG. 11, 405 in FIG. 12). If either user authentication or user level confirmation has failed, a failure message is sent to the IC card 124, and the line with the client terminal is disconnected (step S710 in FIG. 11), thus ending one processing unit.

Upon receiving transfer of user data corresponding to the storage request, the control server 111 temporarily stores the received user data in a reception buffer 20 (see FIG. 13), and checks the presence/absence of transfer errors by, e.g., calculating the check sum of the received user data (step S705 in FIG. 11). As a result, if a transfer error is found, the control server 111 requests the client terminal to re-send user data corresponding to the storage request (step S707 in FIG. 11), and the flow returns to step S704 to wait for that data re-sent from the client terminal.

On the other hand, if no transfer error is found, the control server 111 sends a normal data transfer message, and disconnects the line with the communication terminal 122 or 123 (step S706 in FIG. 11, 407 in FIG. 12). After that, the control server 111 executes a storage destination server select process (step S708 in FIG. 11). The control server 111 then executes a storage process of the user data in the selected data server 112 or 113 (step S709 in FIG. 11), and sends the data storage condition message to the IC card 124 (step S711 in FIG. 11, 408 in FIG. 12), thus ending one processing unit.

In the data storage condition message sending process in step S711 in FIG. 11 (408 in FIG. 12), various kinds of information associated with the data storage condition such as the user data storage result (success or failure) in the selected data server 112 or 113, identification information (IP addresses and the like) of first and second data servers, encryption algorithms and encryption keys used upon storing the user data, and the like are sent to and stored in the IC card 124 via the communication terminal 122 or 123 using a non-real-time communication means (attached file to an e-mail message or the like).

In this embodiment, since a communication line charged based on a connection time is used in a communication between the control server 111 and the communication terminal 122 or 123, the data storage condition message is sent after the communication line is temporarily disconnected, so as to send information associated with the data storage condition to the IC card 124 using a non-real-time communication means.

However, the communication line disconnect process between the control server 111 and the communication terminal 122 or 123 may be done after the data storage condition message sending process. In such case, a change in data storage condition on the IC card 124 can be rapidly confirmed on the control server 111 side. Especially, when the communication line adopts a charge system based on the communication data traffic, the latter method can assure higher convenience than the former method.

The storage destination data server select process in step S708 in FIG. 11 will be described in detail below with reference to the flow chart in FIG. 14.

In this select process, the control server 111 recognizes residence information or the like of the user who is accessing currently (step S801 in FIG. 14), and also recognizes the user level (subscription fee plan, subscription years, and the like) of the user (step S802 in FIG. 14) with reference to the user profile of that user (member).

Figure 14:
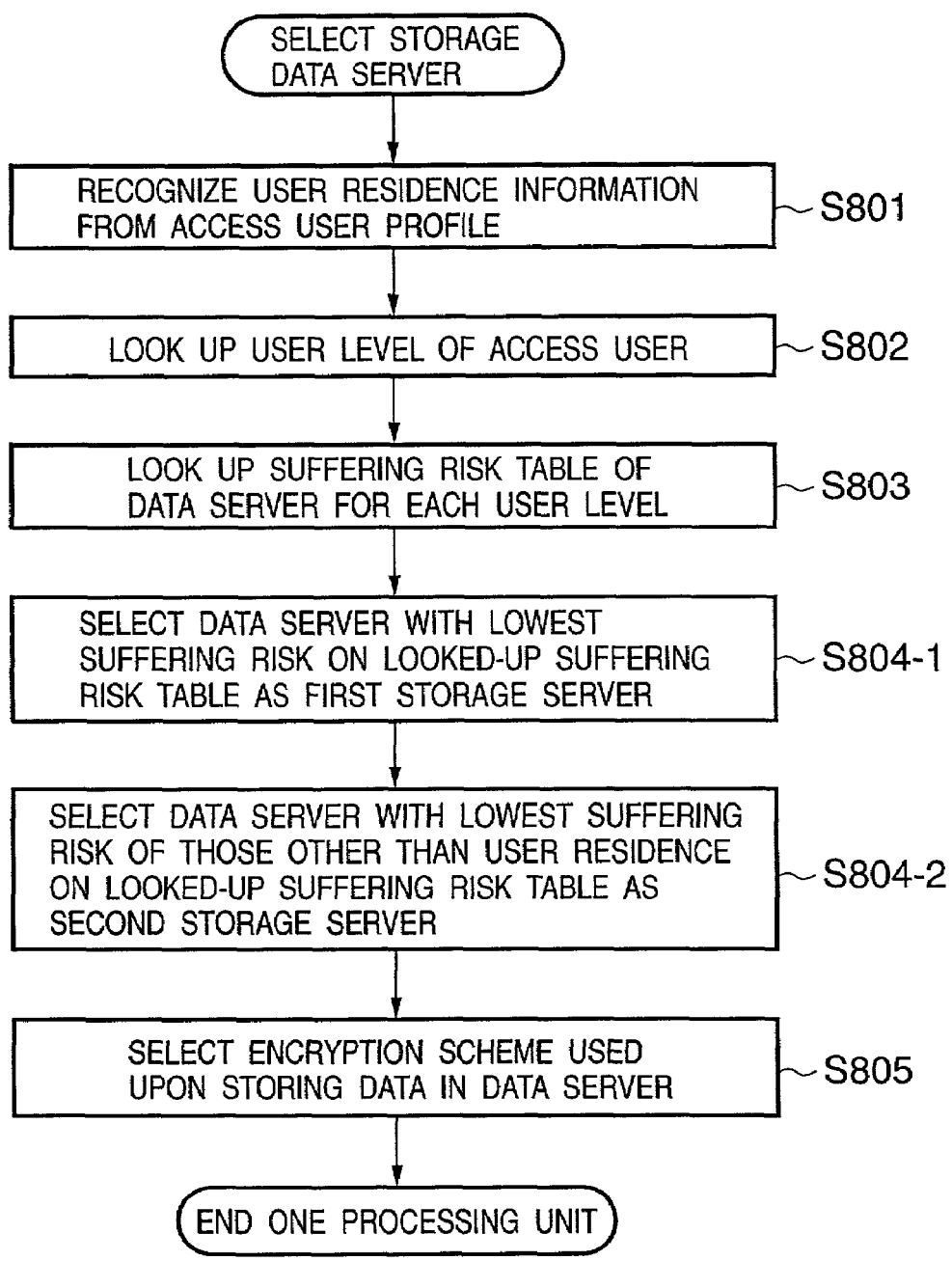
FIG. 14 is a flow chart showing a select process of a data server for storing user data by the control server in the second embodiment.
Figure 17:
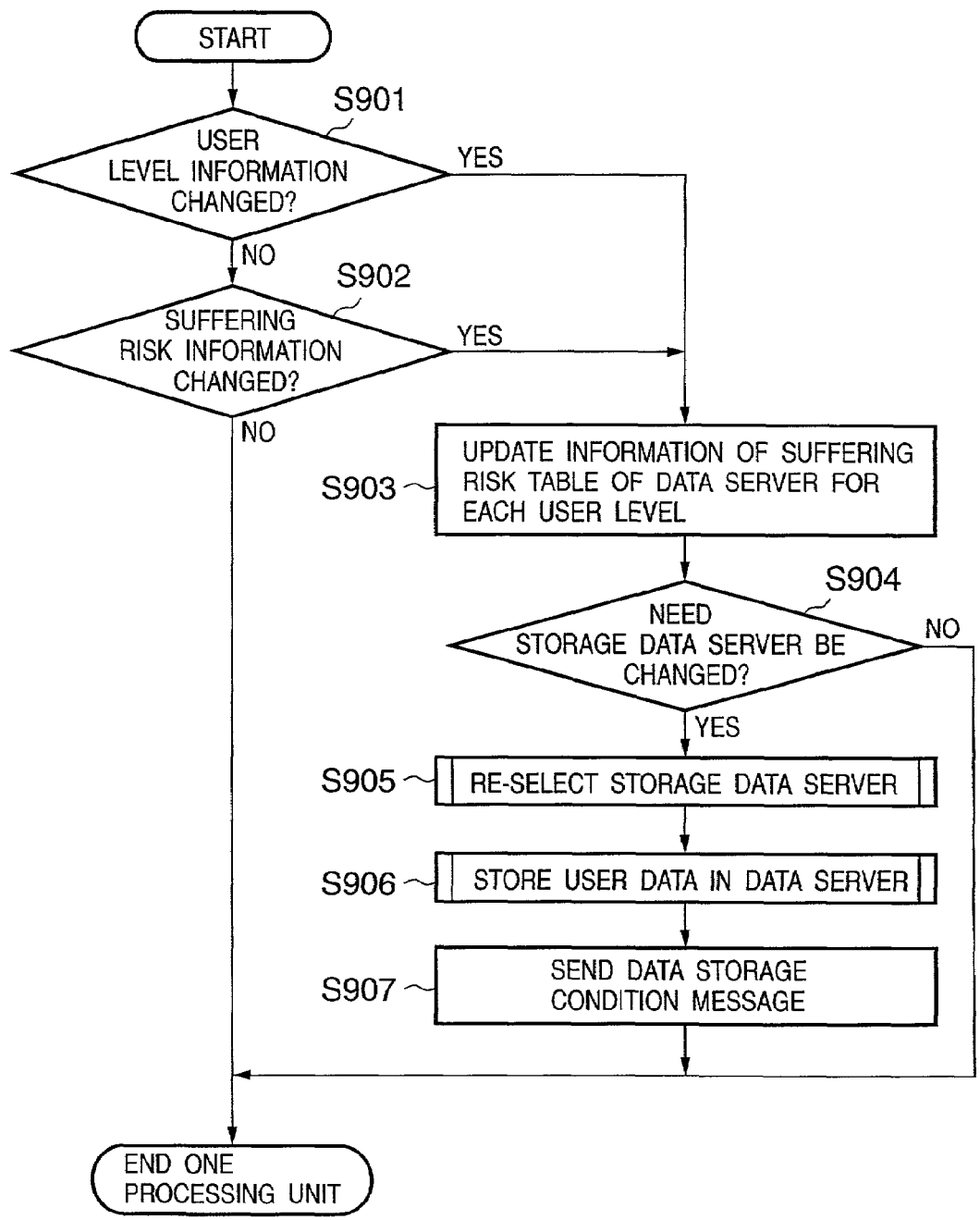
FIG. 17 is a flow chart showing an update process of a suffering risk table for each user level executed by the control server in the second embodiment.

By looking up a suffering risk table (updated every time user level information/suffering risk information has been changed in a process shown in FIG. 17) (step S803 in FIG. 14), a data server with the lowest suffering risk on the suffering risk table of that user level is selected as a first data storage server, and a data server with the lowest suffering risk of those located other than the residence of the user (locations sufficiently physically distant away from the residence) (if the same data server as the select result of the first data storage server is selected, a data server with the second lowest suffering risk) is selected as a second data storage server (steps S804-1 and S804-2 in FIG. 14).

Then, encryption schemes and encryption keys used upon storing data in the selected data servers are selected (step S805 in FIG. 14).

Figure 13:
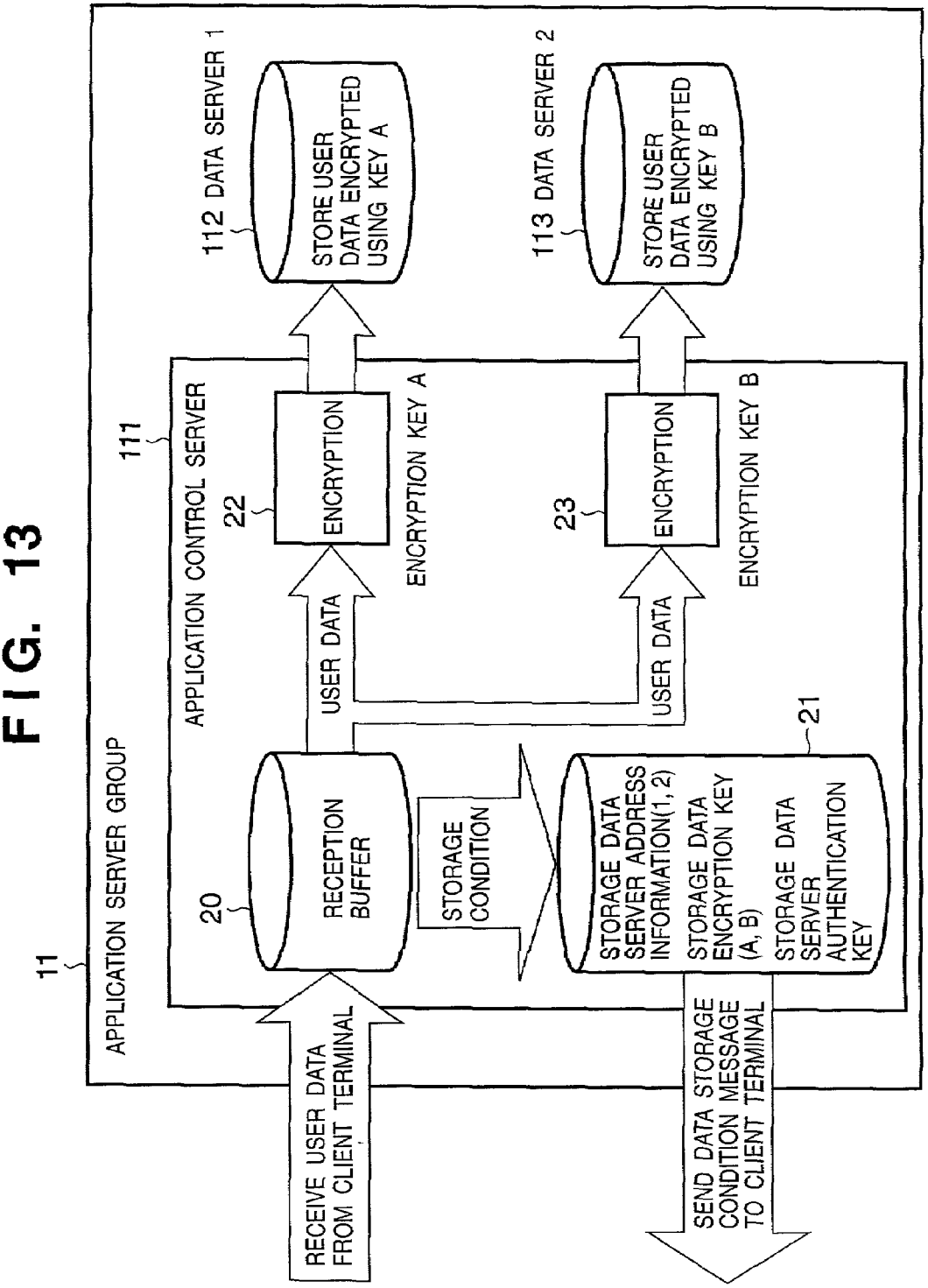
FIG. 13 is a schematic diagram for explaining the process of a control server executed upon receiving a connection request (user data storage request) from a client terminal in the second embodiment of the present invention.

The data storage process in the data servers in step S709 in FIG. 11 will be described in detail below with reference to FIGS. 13, 15, and 16.

Figure 15:
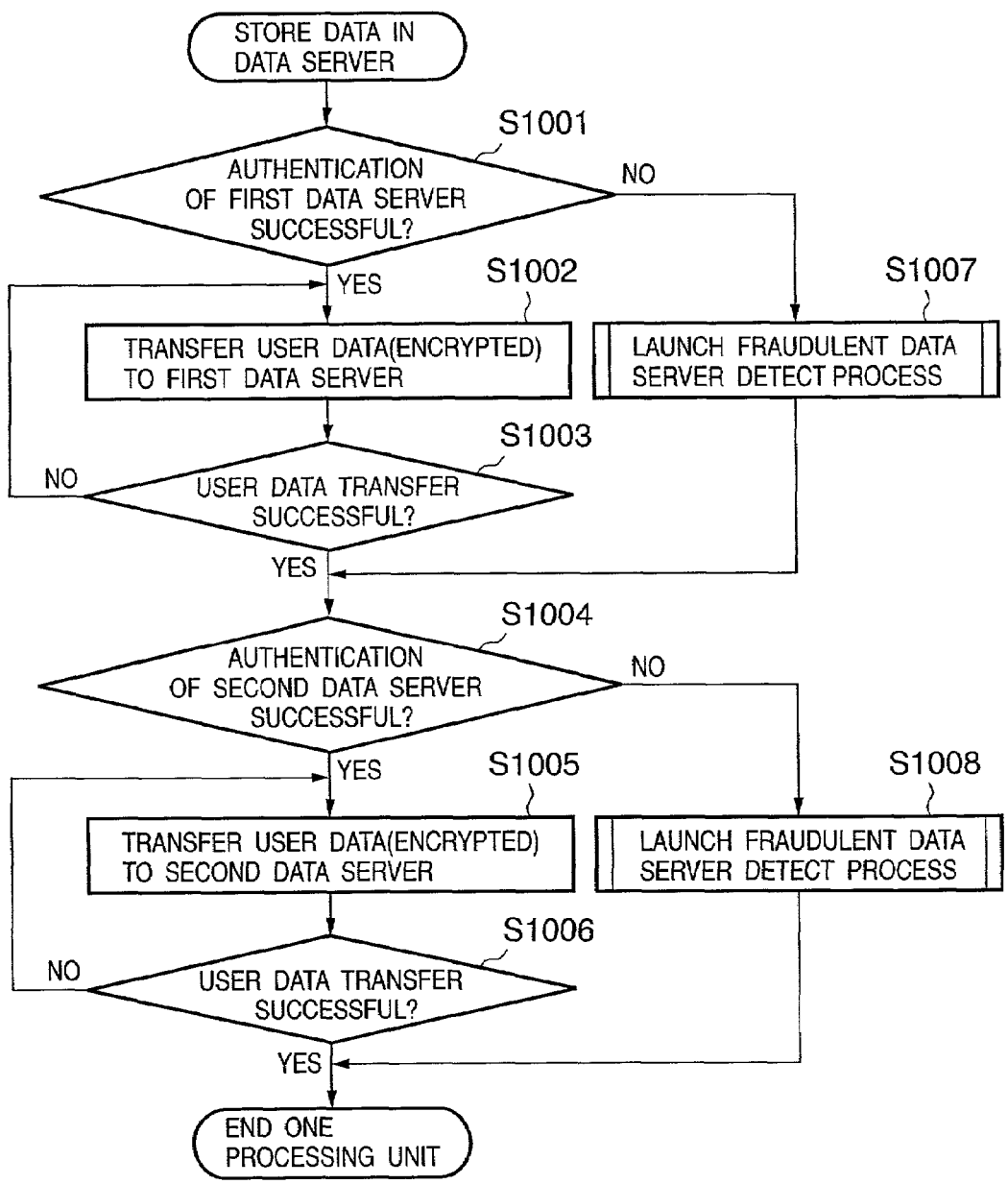
FIG. 15 is a flow chart showing a user data storage process in the selected data server by the control server in the second embodiment.

In this storage process, the control server 111 designates the selected first data storage server (501 in FIG. 16), authenticates the first data storage server (502 in FIG. 16), and confirms if that server is not a fraudulent server such as a pretender or the like (step S1001 in FIG. 15).

Figure 16:
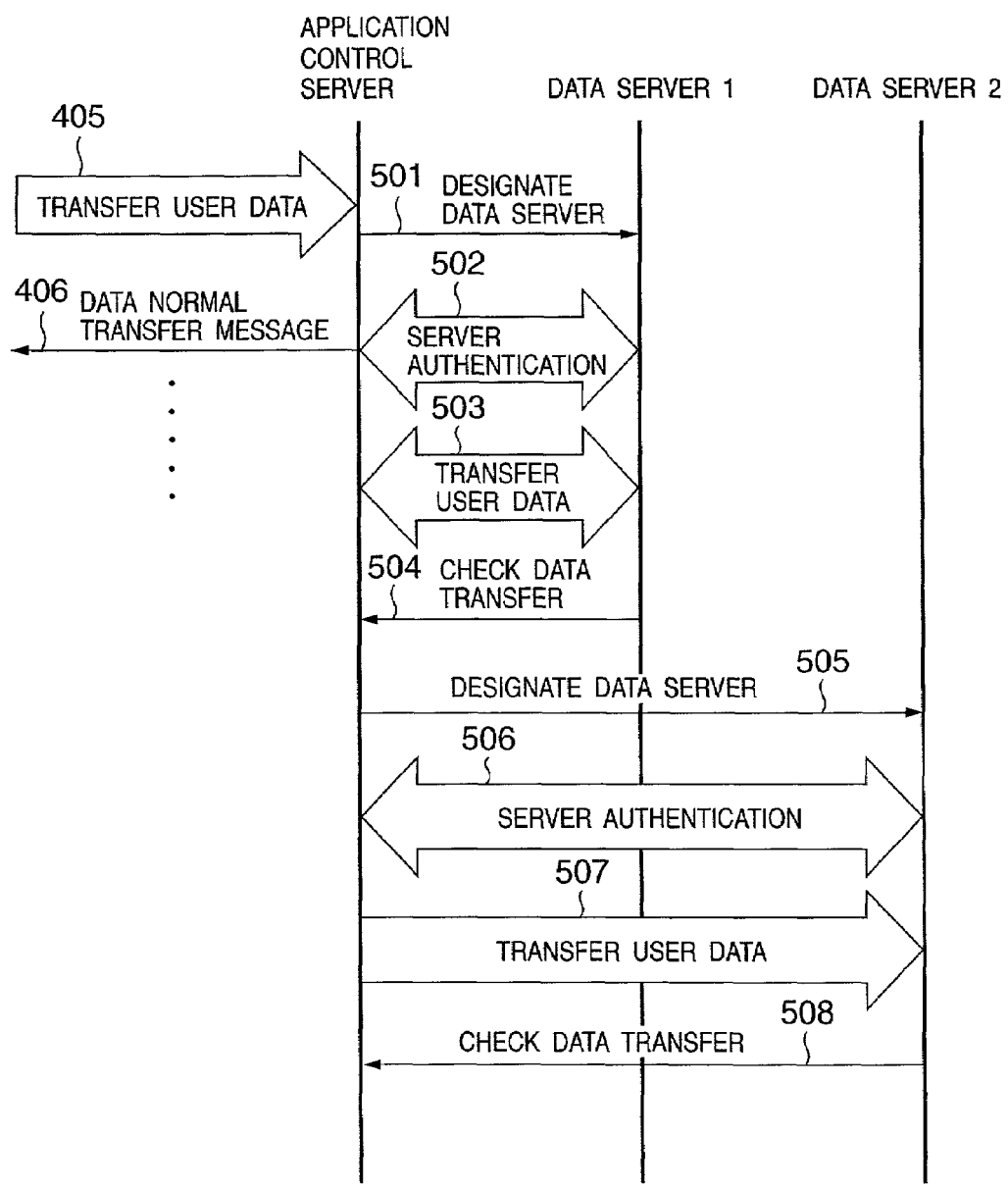
FIG. 16 is a sequence chart showing a communication process executed upon the user data storage process in the selected data server in the second embodiment.

If it is confirmed that the first data storage server is an authentic data server, the control server 111 encrypts user data corresponding to the storage request using encryption key A and encryption algorithm (22 in FIG. 13) for the first data server selected in the aforementioned server select process, and transfers the encrypted data to the first data storage server (503 in FIG. 16, and step S1002 in FIG. 15). It is then checked if a data transfer confirm response is received from the first data storage server (step S1003 in FIG. 15, 504 in FIG. 16). As a result, if the data transfer confirm response is not received, it is determined that data transfer has failed, and the flow returns to step S1002 to re-send data.

On the other hand, if the data transfer confirm response is received, the flow advances to step S1004. Also, if it cannot be confirmed in step S1001 that the first data server is an authentic server, the control server 111 executes a fraudulent data server detect process (step S1007), and the flow advances to step S1004. Note that the fraudulent data server detect process will be described in detail later with reference to the flow chart in FIG. 23.

In step S1004, the control server 111 designates the selected second data storage server (505 in FIG. 16), authenticates the second data storage server (506 in FIG. 16), and confirms if that server is not a fraudulent server such as a pretender or the like.

If it is confirmed that the second data storage server is an authentic data server, the control server 111 encrypts user data corresponding to the storage request using encryption key A and encryption algorithm (23 in FIG. 13) for the second data server selected in the aforementioned server select process, and transfers the encrypted data to the second data storage server (507 in FIG. 16, and step S1005 in FIG. 15). It is then checked if a data transfer confirm response is received from the second data storage server (step S1006 in FIG. 15, 508 in FIG. 16). As a result, if the data transfer confirm response is not received, it is determined that data transfer has failed, and the flow returns to step S1005 to re-send data.

On the other hand, if the data transfer confirm response is received, the server 111 ends one processing unit. Also, if it cannot be confirmed in step 1004 that the second data server is an authentic server, the control server 111 executes a fraudulent data server detect process (step S1008), thus ending one processing unit. Note that the fraudulent data server detect process will be described in detail later with reference to the flow chart in FIG. 23.

With the aforementioned process, since the application service subscriber can store desired user data in a data server with the lowest risk of suffering disasters such as earthquakes, typhoons, and the like at a location other than the residence of that member without any special operation for designating the data storage location, important user data can be protected from physical damages due to disasters on the member's home or resident area.

On the other hand, since the user data storage application provider selects a data server in consideration of the member's level (subscription fee plan, subscription years, and the like) as a parameter, the provider can provide an even data storage service according to the user levels to users, and can prevent the data server from becoming full of data without increasing the number of data servers, thus providing a data storage service with high profit efficiency.

The update process of the suffering risk table for each user level will be described below with reference to the flow chart in FIG. 17. Note that this update process of the suffering risk table is periodically and automatically executed by the control server 111.

In this update process, the control server 111 checks with reference to the user profile if user level information of each user has changed (step S901), and checks with reference to the disaster information database 13 if suffering risk information has changed (step S902). As a result, if neither the user level information nor suffering risk information have changed, the server 111 ends one processing unit.

On the other hand, if at least one of the user level information and suffering risk information has changed, the control server 111 updates the information of the suffering risk table for each user level on the basis of the changed information (step S903) The server 111 checks if the storage data server must be changed in correspondence with the updated contents of the table (step S904). If the storage data server need not be changed, the server 111 ends one processing unit.

On the other hand, if the storage data server must be changed, the control server 111 re-selects a storage data server (step S905) on the basis of the flow chart in FIG. 14 above. Then, the server 111 stores user data in the re-selected storage data server again (step S906) on the basis of the flow chart in FIG. 15 above.

The data storage condition that has changed upon re-storage is sent to and stored in the IC card 124 via the communication terminal 122 or 123 using a non-real-time communication means (attached file to an e-mail message or the like) (step S907), thus ending one processing unit.

In this way, even when the user level or suffering risk has changed, since user data that has been saved in the data server can automatically undergo a storage data server re-select process and re-storage process in correspondence with that change, a high-quality service can be provided.

A communication process executed upon reading out user data (digital photo information or the like) saved in the data servers 112 and 113 and outputting the readout data by the remote printer 121 will be described below with reference to the flow chart in FIG. 18 and the sequence chart in FIG. 19.

Figure 18:
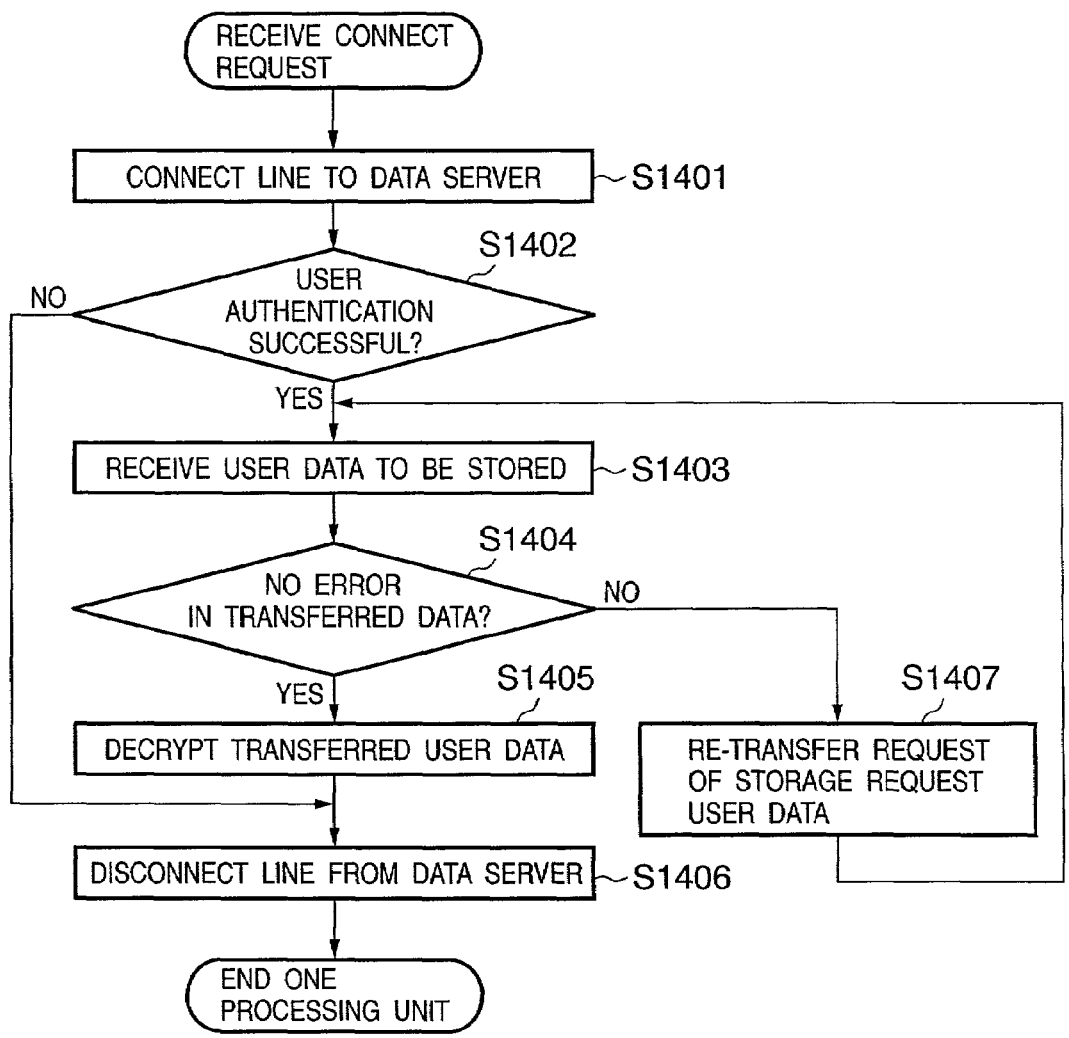
FIG. 18 is a flow chart showing a user data download process from a data server executed by a remote printer in the second embodiment.
Figure 19:
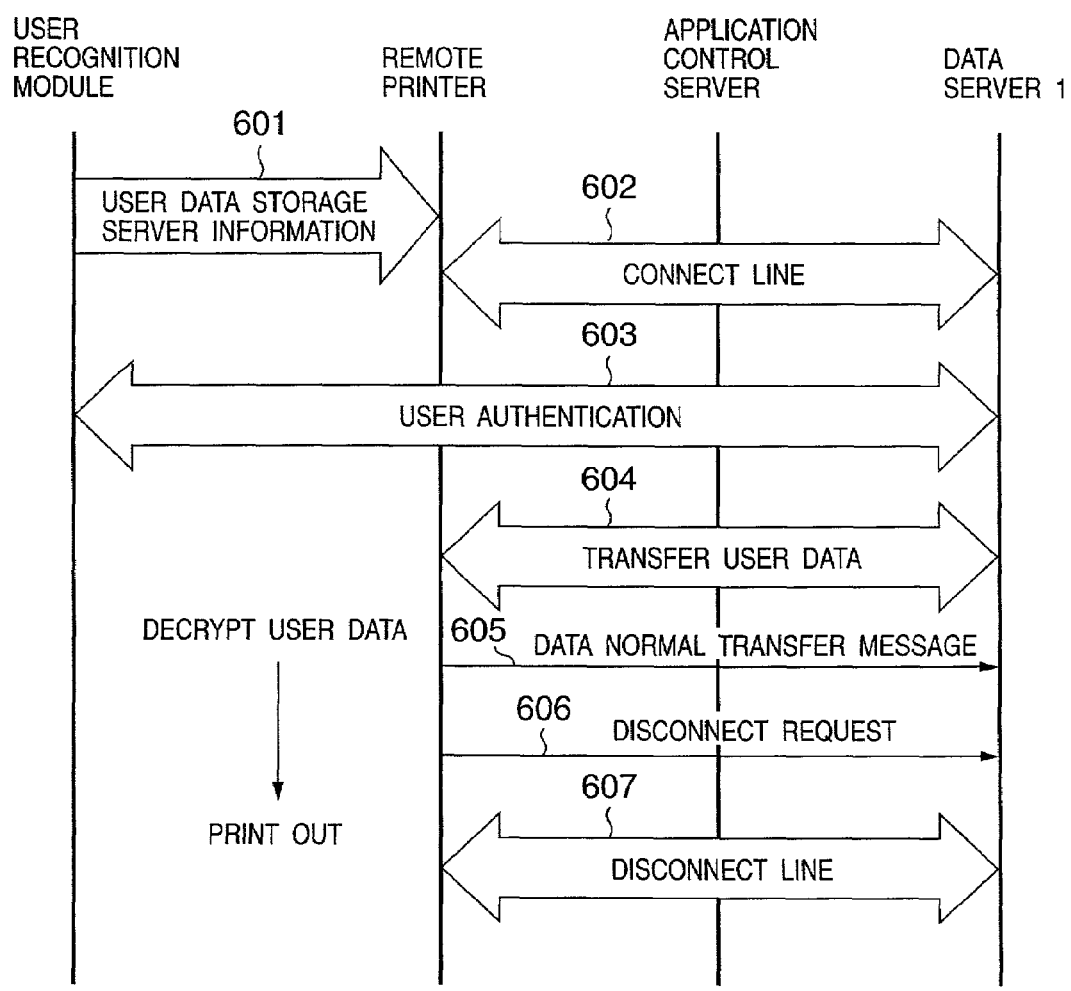
FIG. 19 is a sequence chart showing a communication process executed upon executing the user data download process from the data server in the second embodiment.

The remote printer 121 reads out various kinds of information (the address for access, encryption key and algorithm used, and the like) associated with a data server that stores user data from the IC card 124 inserted into that remote printer 121 (601 in FIG. 19). Note that the user selects user data to be output in advance by operating the remote printer (not shown in FIGS. 18 and 19).

The remote printer 121 sets a communication line with the data server (data server 1 (112) in this case) that stores the selected user data (step S1401 in FIG. 18, 602 in FIG. 19). Then, a user authentication process is done between the connected data server 112 and IC card 124 (step S1402 in FIG. 18, 603 in FIG. 19). If user authentication has failed, the line is disconnected (step S1406 in FIG. 18), thus ending the user data read-out process.

On the other hand, if user authentication has succeeded, the remote printer 121 receives user data from the data server 112 (step S1403 in FIG. 18, 604 in FIG. 19), and checks the presence/absence of any transfer errors by calculating, e.g., the check sum (step S1404 in FIG. 18, 605 in FIG. 19). If any transfer error is found, the remote printer 121 requests to re-send the user data (step S1407 in FIG. 18), and the flow returns to step S1403.

On the other hand, if no transfer error is found, the remote printer 121 decrypts the transferred data using the encryption key and algorithm used (step S1405 in FIG. 18). The line is then disconnected (step S1406 in FIG. 18, 606, 607 in FIG. 19), thus ending the user data read-out process.

The authentication process of stored data will be explained below with reference to FIGS. 20 to 23. Note that the authentication process of stored data is periodically executed by the control server 111.

Figure 20:
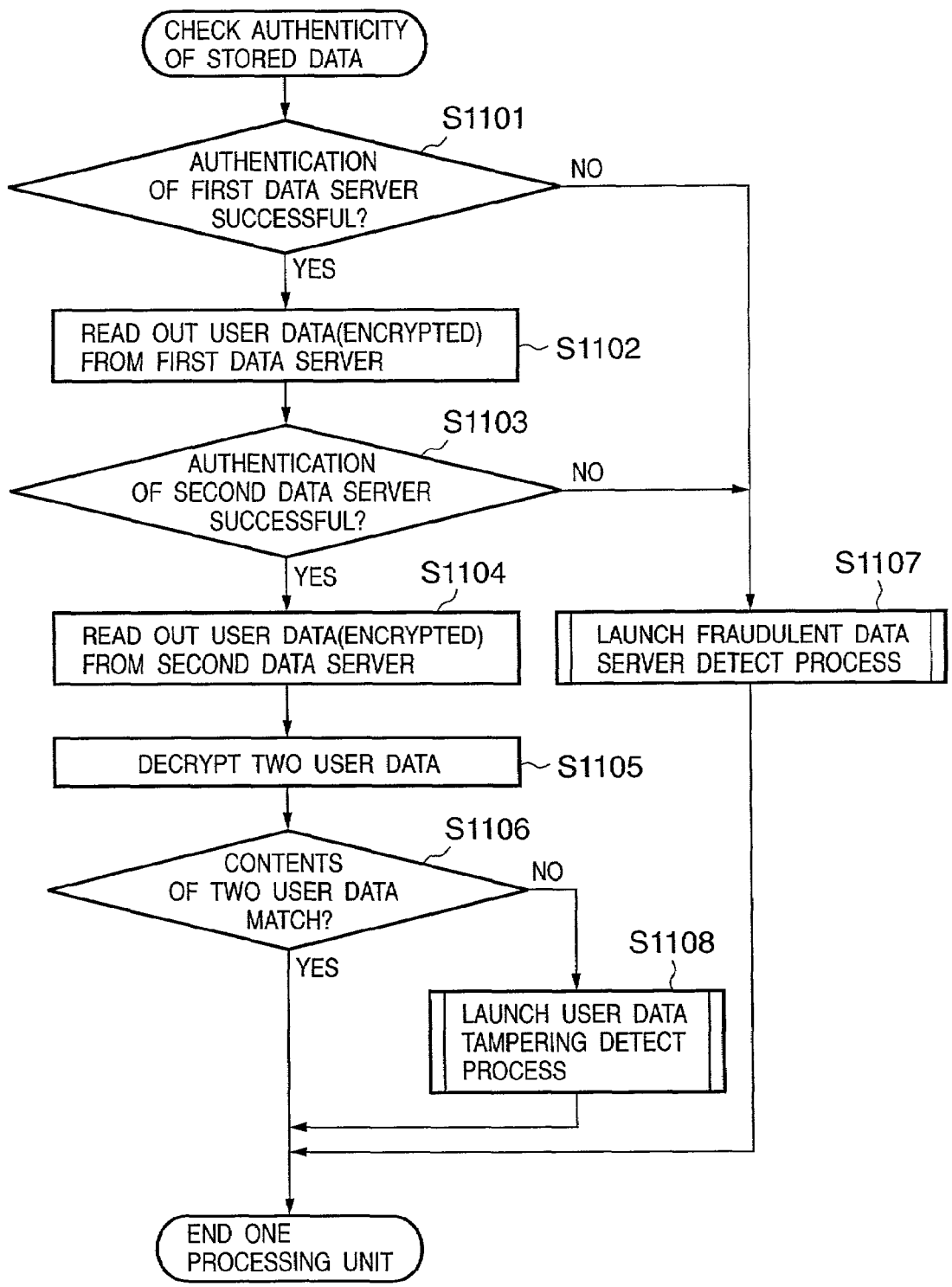
FIG. 20 is a flow chart showing an authentication process of user data in the data server executed by the control server in the second embodiment.
Figure 21:
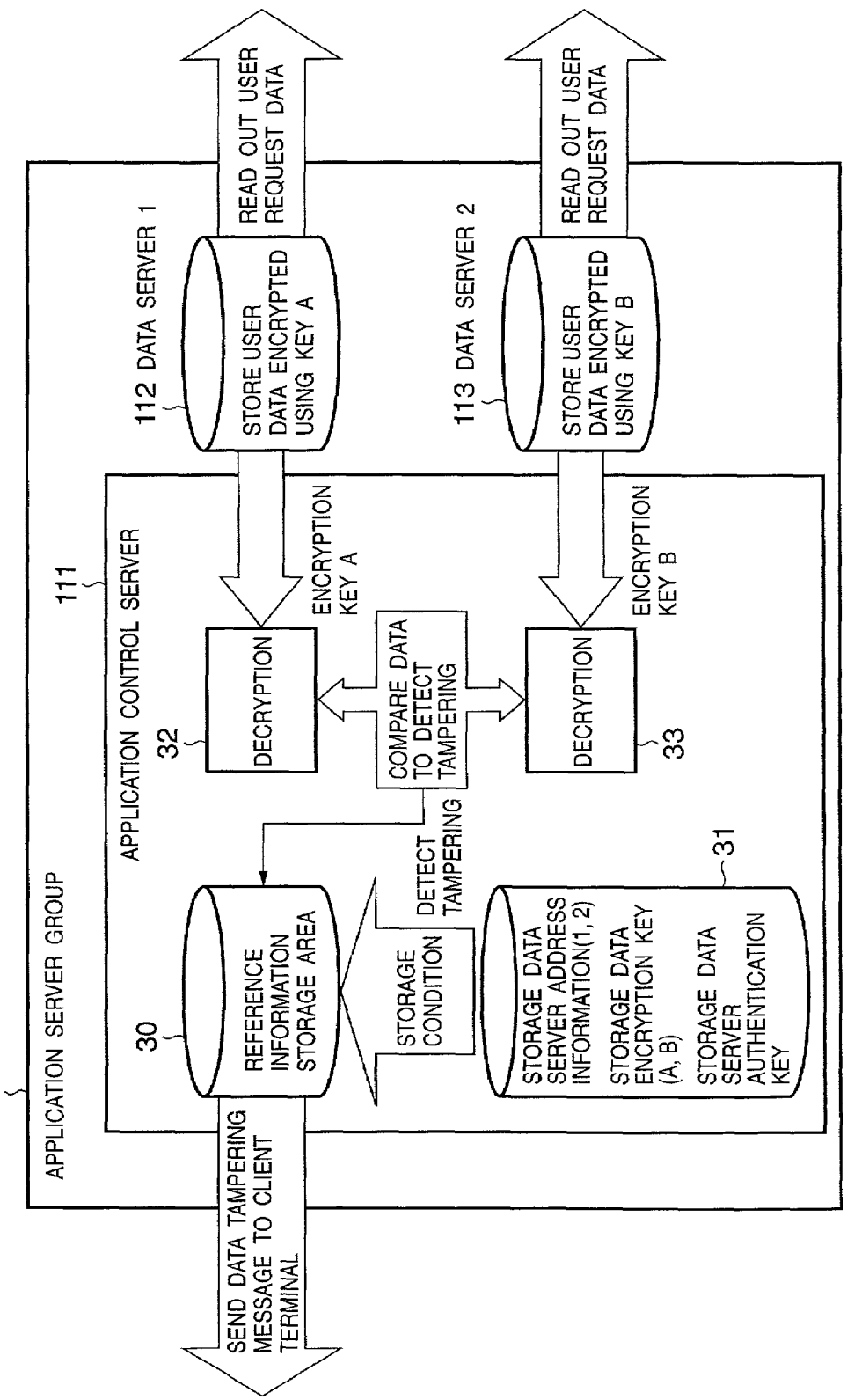
FIG. 21 is a schematic diagram for explaining the authentication process of user data in the data server executed by the control server in the second embodiment.

The control server 111 reads out information (addresses of the storage data servers, encryption key information used, and the like) associated with the data servers (first and second storage data servers) that store user data (digital photo information) of a member whose data is to be authenticated, from an application subscriber information storage area (31 in FIG. 21) in the control server 111, and executes server authentication processes of the first and second storage data servers (steps S1101 and S1103 in FIG. 20).

If server authentication of at least one of the first and second storage data servers has failed, a fraudulent data server detect process is executed (step S1107 in FIG. 20), thus ending one processing unit. Note that the fraudulent data server detect process will be described in detail later with reference to FIG. 23.

On the other hand, if server authentication of both the first and second storage data servers has succeeded, the control server 111 fetches user data associated with encryption in these first and second storage data servers (steps S1102 and S1104 in FIG. 20).

The control server 111 decrypts the fetched user data associated with encryption using the corresponding encryption key and algorithm (step S1105 in FIG. 20, 32, 33 in FIG. 21), and checks if two user data match (step S1106 in FIG. 20). As a result, if the two user data match, one processing unit ends. On the other hand, if the two user data do not match, the control server 111 executes a user data tampering detect process (step S1108 in FIG. 20), thus ending one processing unit.

Figure 22:
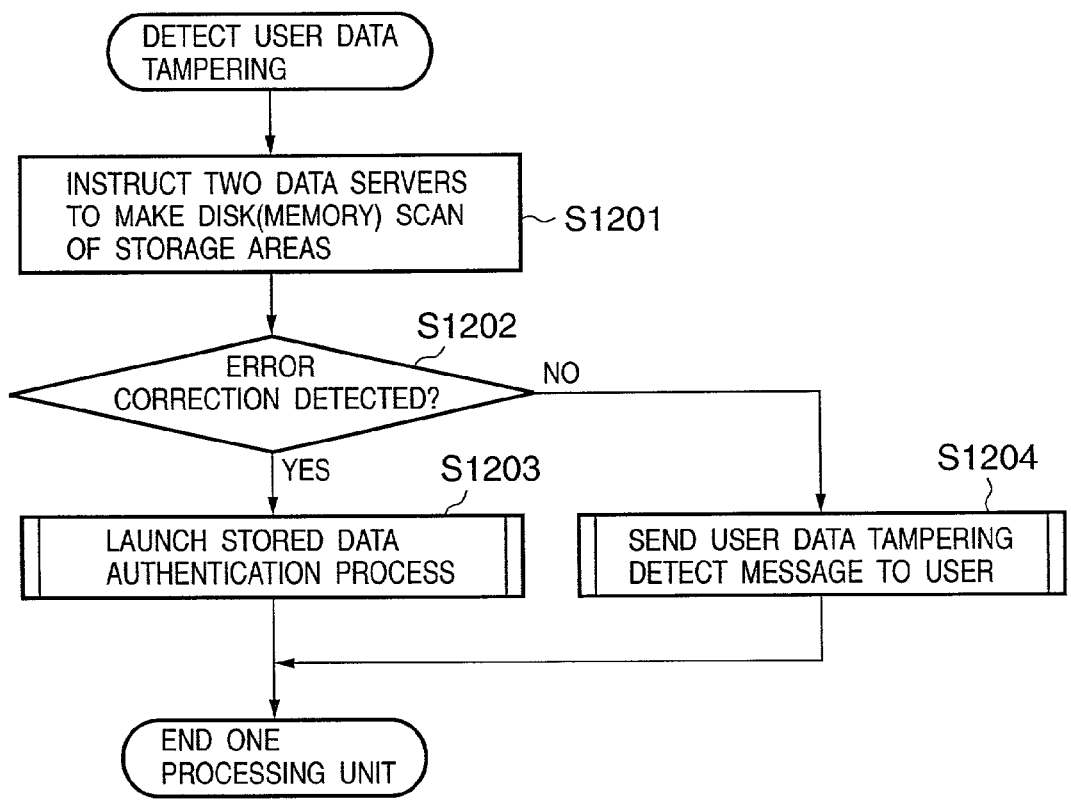
FIG. 22 is a flow chart showing a tampering detect process of user data executed by the control server in the second embodiment.

The user data tampering detect process in step S1108 in FIG. 20 will be described in detail below with reference to the flow chart in FIG. 22.

In this user data tampering detect process, the control server 111 instructs both the data servers 112 and 113 to be compared to make disk (memory) scan (local check) of the user data storage areas associated with the user of interest (identical user) (step S1201). Upon receiving this instruction, the data servers 112 and 113 execute an error detect process of the user data storage areas and also a correction process if errors are correctable, and send the processing results to the control server 111.

The control server 111 checks if the data servers 112 and 113 have made error correction (step S1202). If error correction has been made, the control server 111 executes an authentication process of stored data in FIG. 20 again (step S1203).

If no error correction is made, the control server 111 determines that a third party has tampered with user data, stores difference position information between the two user data in a reference information storage area 30 (32 in FIG. 21), and sends it to the user via the communication terminal (step S1204).

Figure 23:
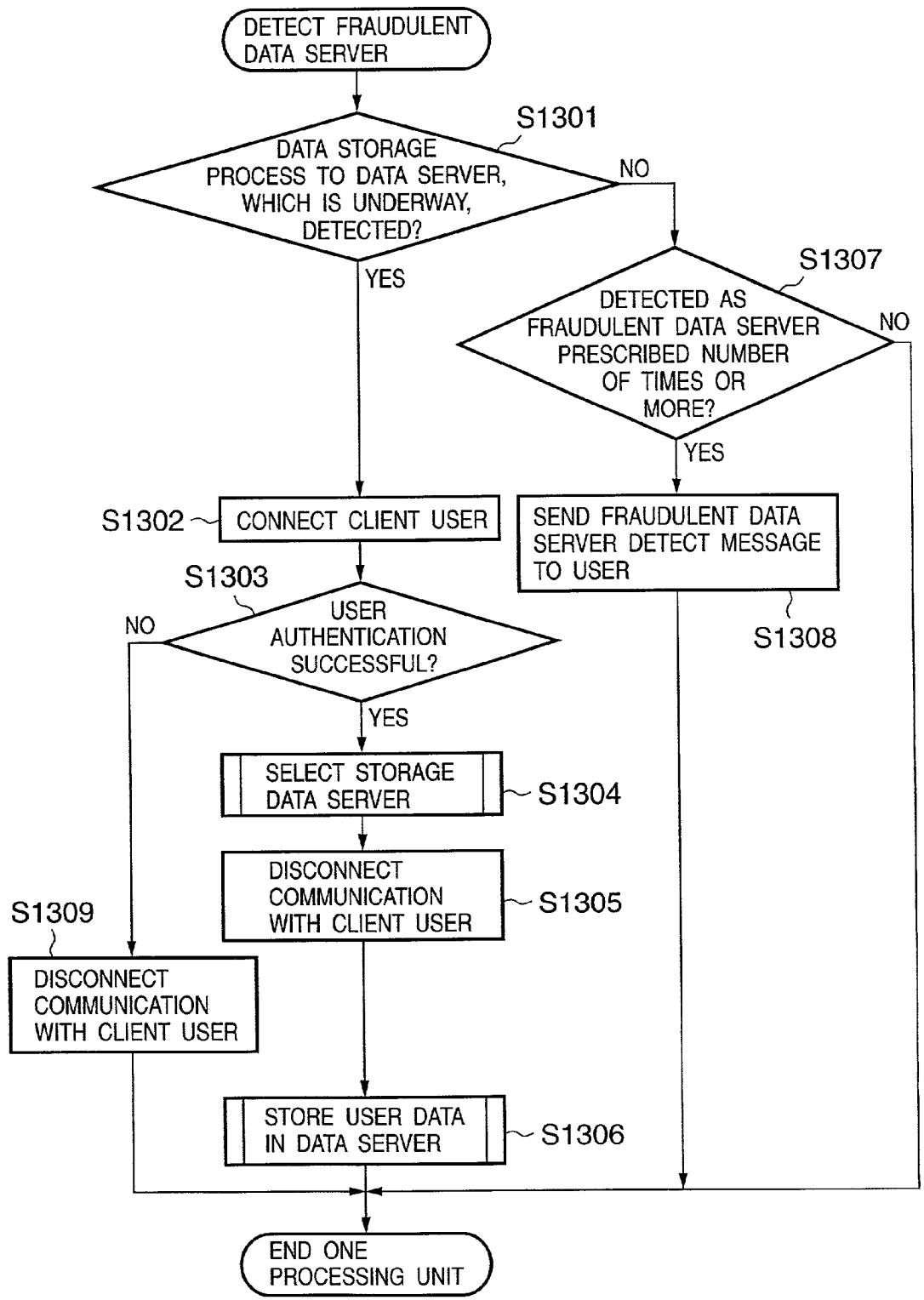
FIG. 23 is a flow chart showing a fraudulent data server detect process executed by the controlling sever in the second embodiment.

The fraudulent data server detect process in step S1107 in FIG. 20 will be described in detail below with reference to the flow chart in FIG. 23.

If write of user data to the data server is in progress at the time of detecting a fraudulent data server, the control server 111 launches a communication line setup process with a client user (member) (steps S1301 and S1302). The control server 111 executes user authentication with the IC card 124 (step S1303). If user authentication has failed, the communication line with the client user (member) is disconnected (step S1309), thus ending one processing unit.

If user authentication has succeeded, storage data servers are selected again (step S1304) on the basis of the flow chart in FIG. 14. In this select process, the priority order upon selecting the data server detected as the fraudulent server is lowered. The control server 111 then disconnects the communication line with the client user (member) (step S1305), and executes a data storage process to the re-selected data servers (step S1306) on the basis of the flow chart in FIG. 15, thus ending one processing unit.

If it is determined in step S1301 that a write process to the data server is not in progress at the time of detecting the fraudulent data server, it is checked if the detect count as a fraudulent server is equal to or larger than a prescribed value (an arbitrary value equal to or larger than 1 can be set) (step S1307). As a result, if the detect count as a fraudulent server is not equal to or larger than the prescribed value, one processing unit ends; otherwise, a message indicating this is sent to the member via the client terminal (step S1308), thus ending one processing unit. Assume that this message uses a non-real-time communication such as an e-mail message or the like in this embodiment.

Since the control server 111 automatically and periodically checks the authenticity of user data on the data servers, labor required for the application subscriber to check the authenticity (free from tampering or the like) of user data such as digital photo information stored on each data server can be greatly reduced.

Figure 24:
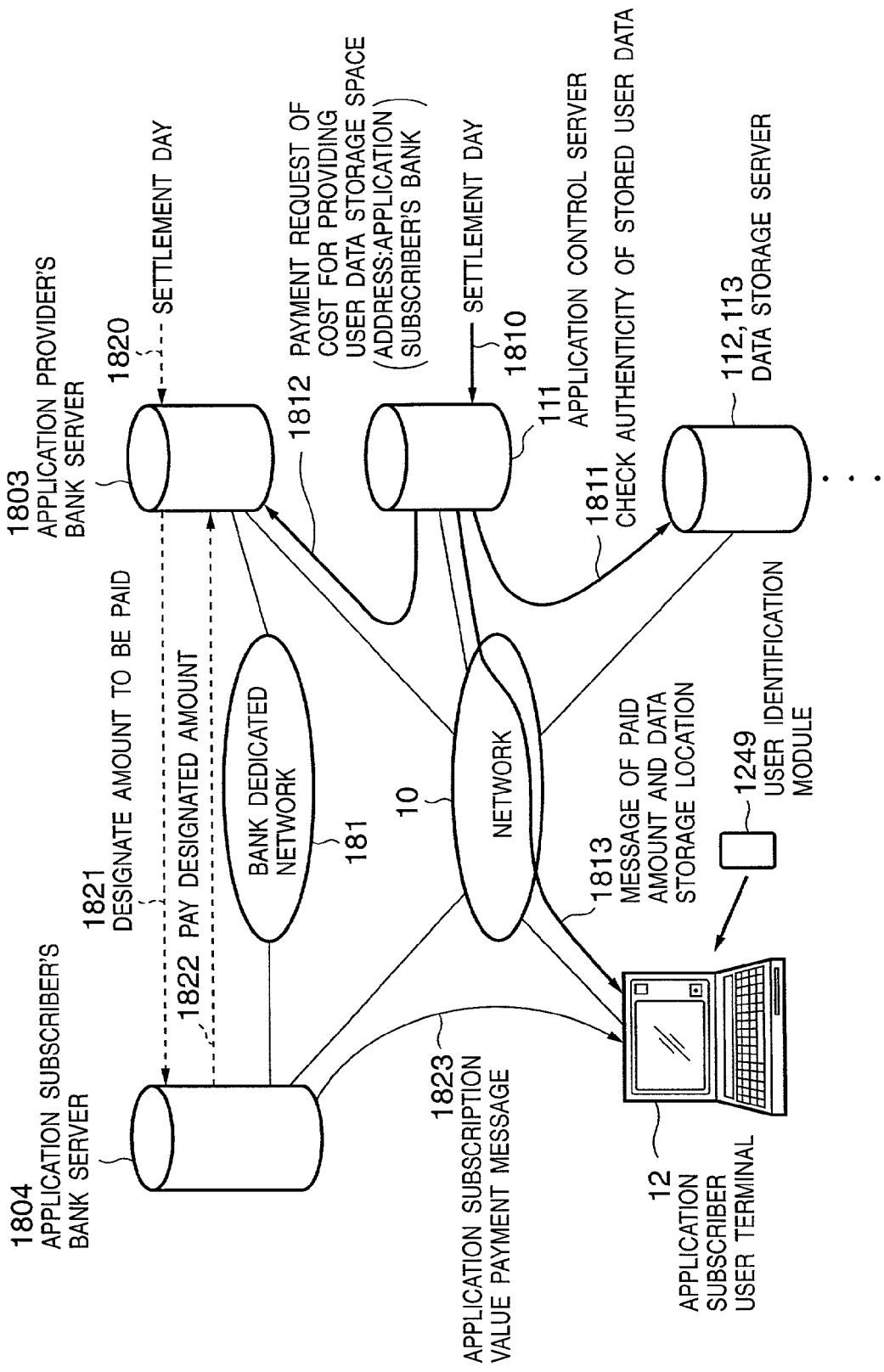
FIG. 24 is a diagram for explaining a charge process that uses a closed network (dedicated network) together in the second embodiment.

FIG. 24 is a diagram for explaining a charge process for a member (to pay a fee for application service subscription) in the user data storage/management system of the present invention.

Referring to FIG. 24, reference numeral 111 denotes a control server shown in FIG. 1 and the like; and 112 and 113, data servers shown in FIG. 1. Reference numeral 1803 denotes an information server of a bank of a provider that provides the application service of the present invention (to be referred to as a service provider hereinafter); 1804, an information server of member's (subscriber of an application service of the present invention; to be referred to as a user hereinafter) bank; 10, a network shown in FIG. 1; and 181, a dedicated network (closed network) of the banks.

Figure 25:
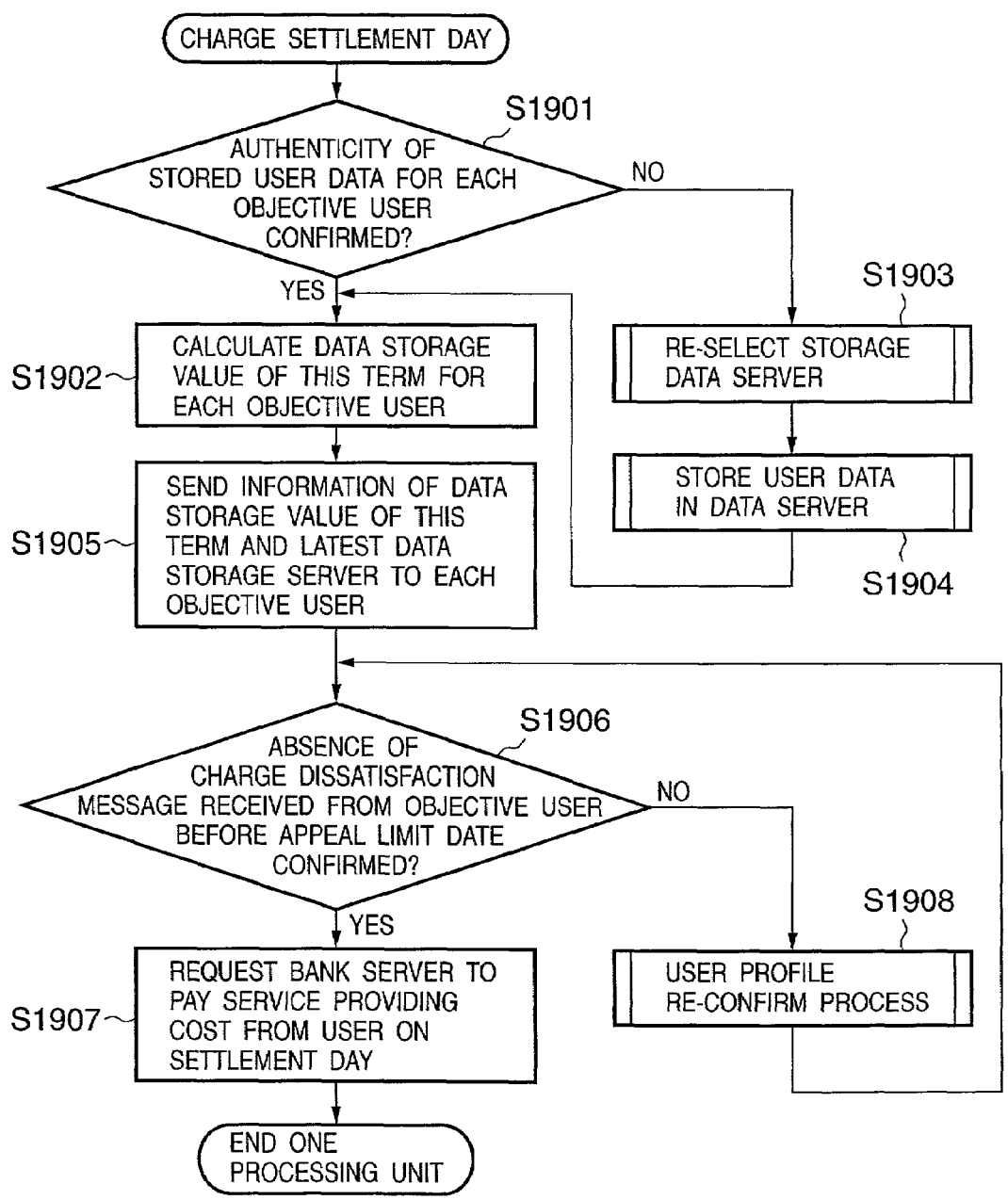
FIG. 25 is a flow chart showing an accounting process executed by the control server in the second embodiment.

The charge process of the control server 111 for a member will be explained below with reference to the flow chart in FIG. 25 and FIG. 24 as needed.

If a charge settlement day (1810 in FIG. 24) of a member is reached, the control server 111 checks the authenticity of user data associated with storage for each user who is to undergo charge settlement (1811 in FIG. 24, step S1901 in FIG. 25) on the basis of the flow chart in FIG. 20. As a result, if the authenticity of user data can be confirmed, a value for data storage of the current term is calculated for each user who is to undergo charge settlement on the basis of various conditions such as the user level, the presence/absence of data tampering, and the like (step S1902).

On the other hand, if the authenticity of user data cannot be confirmed, the re-select process of storage data servers is executed (step S1903) based on the flow chart in FIG. 14, and a storage process of user data in the re-selected data servers is executed (step S1904) based on the flow chart in FIG. 15. After that, a value for data storage of the current term is calculated for each user who is to undergo charge settlement on the basis of various conditions such as the user level, the presence/absence of data tampering, and the like (step S1902).

The value for data storage of the current term and the latest information of storage servers (IP addresses, encryption algorithms and keys, trouble history, dissatisfaction appeal limit date and method, and the like) are sent to each user via the network 10 using a non-real-time communication means (attachment file to an e-mail message or the like) (1813 in FIG. 24, step S1905 in FIG. 15). Note that the message (mail message) can be received and confirmed on the communication terminal 122 or 123 connected to the network 10. Also, the IC card 124 may be inserted into the communication terminal 122 or 123, and can store the received mail message.

If the user is not satisfied with the contents (charged amount, trouble history, or the like), he or she can appeal to the service provider up to the limit date in accordance with the dissatisfaction appeal method described in the message. Hence, the control server checks if the user has appealed before the limit date (step S1906).

As a result, if the user has not appealed, the control server 111 sends a message to the information server 1803 of the bank of the service provider to transfer the designated amount from the user's bank account on the settlement day (1812 in FIG. 24, step S1907 in FIG. 25), thus ending one processing unit. On the other hand, if the user has appealed, a re-check process of the user profile and the like of the user of interest is executed (step S1908), and the flow returns to step S1906 to check the presence/absence of dissatisfaction appeal from that user.

On the charge settlement day, the information server 1803 of the bank of the service provider designates the amount to be paid and payment account to the information server 1804 of the user's bank (1821 in FIG. 24). With this designation, the information server 1804 of the user's bank pays the designated amount to the designated account (1822 in FIG. 24), and sends a message indicating that the service subscription value has paid and a payment history (1823 in FIG. 24) to the user using a non-real-time communication means (attached file to an e-mail message), thus storing the payment history in the IC card 124.

With this process, a charge process under agreement between the service provider and user can be implemented on the user data storage/management system. Since both the control server 111 and IC card 124 manage information for each user such as charge information, various kinds of information associated with the storage data servers, payment information from the bank, and the like, the user can confirm those kinds of information, and tampering of stored data can be reliably detected.

Note that the present invention is not limited to the second embodiment. For example, text information, video streaming information (digital movie information), audio information, and the like can be saved and managed in addition to digital photo information. As the user identification module, a non-contact type IC card may be used in place of the IC card (an IC card with terminals complying with ISO7816). Furthermore, the user identification module itself may be integrally built in a portable phone, portable information terminal, or the like, or functions equivalent to those of the user identification module may be installed therein, thus omitting labor for mounting the user identification module on the terminal.

The suffering risk discrimination process need not only use the earthquake prediction information, typhoon information, and the like of the disaster information database 13, but also use rate information for respective areas of nonlife insurance (fire insurance, earthquake insurance) managed by a nonlife insurance company or the like. Also, in place of a charge/settlement system based on a direct transfer process using the dedicated network system (closed network) among the banks, a charge/settlement system using a debit card/credit card system that uses encrypted communications on a versatile network (open network) as communication media may be used.

Furthermore, if a digital cash (digital money that allows movement of values without endorsement of a bank control server) application is installed on the IC card 124, the user who received a payment amount message sends digital cash to the control server 111 via encrypted communications on a versatile network (open network) as communication media, direct settlement can be made without intervention of the bank server.

As described above, according to the second embodiment of the present invention, since data corresponding to a storage request is stored in a server which is selected in correspondence with at least the user's service subscription qualification level, an even data storage service can be provided without lowering the profit efficiency.

The preferred embodiments of the present invention have been described. However, the objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention.

The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

As many apparently widely different embodiments of the present invention can be made without departing from the spirit and scope thereof, it is to be understood that the invention is not limited to the specific embodiments thereof except as defined in the claims.

What is claimed is:

1. A data management method using a network system which includes a server, a client terminal and a plurality of data servers, comprising:
    a reception step of making the server receive a user's data storage request and data to be stored from the client terminal;
    a select step of making the server automatically select data servers for storing the data from the plurality of data servers, the selected data servers being different from each other and including at least a first data server and a second data server, said first data server being located in an area which is different from an area of user's address registered by the user of the client terminal, said second data server being located in an area with a disaster rate of occurrence equal to or smaller than a predetermined threshold;
    a storage step of making the server send the data to the selected data servers, and store the data in the selected data; and
    a step of making the server acquire disaster information from a disaster information database that provides disaster information, and search for the area with said disaster rate of occurrence equal to or smaller than said predetermined threshold on the basis of the acquired disaster information for selecting the server in the select step.

2. The method according to claim 1, further comprising:
    a step of making the server encrypt the data, and
    wherein the storage step includes the step of:
    making the server send the data encrypted by different methods to the respective data servers, and store the data in the data servers.

3. The method according to claim 2, further comprising:
    a step of making the server periodically acquire the encrypted data from the data servers;
    a step of making the server decrypt the acquired data; and
    a step of making the server compare the decrypted data.

4. The method according to claim 1, further comprising:
    a step of making the server send to the client terminal addresses of the data servers that store the data.

5. The method according to claim 2, further comprising:
    a step of making the server send to the client terminal addresses of the data servers that store the data, and a key used to decrypt the encrypted data.

6. The method according to claim 1, wherein information of the user's address is pre-stored in the server.

7. The method according to claim 1, further comprising:
    a step of making the data server receive a user's data transmission request from the client terminal; and
    a step of making the data server send data associated with the data transmission request to the client terminal.

8. A server comprising:
    reception means for receiving a user's data storage request and data to be stored sent from a client terminal;
    select means for automatically selecting data servers for storing the data from a plurality of data servers, the selected data servers being different from each other and including at least a first data server and a second data server, said first data server being located in an area which is different from an area of user's address registered by the user of the client terminal, said second data server being located in an area with a disaster rate of occurrence equal to or smaller than a predetermined threshold;
    sending means for sending the data to the selected data servers via a communication line; and
    searching means for acquiring disaster information from a disaster information database that provides disaster information, and searching for the area with said disaster rate of occurrence equal to or smaller than said predetermined threshold on the basis of the acquired disaster information for selecting the server by the select means.

9. A computer program making a computer function as:
    reception means for receiving a user's data storage request and data to be stored sent from a client terminal;
    select means for automatically selecting data servers for storing the data from a plurality of data servers, the selected data servers being different from each other and including at least a first and a second data server, said first data server being located in an area which is different from an area of user's address registered by the user of the client terminal, said second data server being located in an area with a disaster rate of occurrence equal to or smaller than a predetermined threshold;

sending means for sending the data to the selected data servers via a communication; and searching means for acquiring disaster information from a disaster information database that provides disaster information, and searching for the area with said disaster rate of occurrence equal to or smaller than said predetermined threshold on the basis of the acquired disaster information for selecting the server by the select means.

10. A data management system including a control server, a client terminal, and a plurality of data servers, which can communicate with each other via a communication line, said control server comprising:

reception means for receiving a user's data storage request and data to be stored sent from the client terminal;

select means for automatically selecting data servers for storing the data from the plurality of data servers, the selected data servers being different from each other and including at least a first data server and a second data server, said first data server being located in an area which is different from an area of user's address registered by the user of the client terminal, said second data server being located in an area with a disaster rate of occurrence equal to or smaller than a predetermined threshold;

sending means for sending the data to the selected data servers; and searching means for acquiring disaster information from a disaster information database that provides disaster information, and searching for the area with said disaster rate of occurrence equal to or smaller than said predetermined threshold on the basis of the acquired disaster information for selecting the server by the select means; and said data servers comprising:

means for storing the data sent from said control server.

11. The server according to claim 8, wherein said select means automatically selects the data server based on the user's service subscription qualification level.

12. The server according to claim 11 wherein said sending means encrypts the data using an encryption method corresponding to the data servers selected by said select means.

13. The server according to claim 11, wherein the service subscription qualification level is determined based on a subscription fee for a service.

14. The server according to claim 11, wherein the service subscription qualification level is determined based on a service subscription term.

15. The server according to claim 11, wherein said select means selects a data server with a lowest suffering risk from the plurality of data servers corresponding to the service subscription qualification level of the user who issued the storage request, and a server with a lowest suffering risk of the data servers in a different area from the area of user's address registered by the user who issued the storage request.

16. The server according to claim 11, wherein when the user's service subscription qualification level has changed, said select means re-selects the data servers, and said sending means sends the data again to the data servers re-selected by said select means.

17. The server according to claim 11, wherein said select means re-selects the data servers in accordance with a change in disaster information, and said sending means sends the data again to the data servers re-selected by said select means.

18. The server according to claim 11, further comprising checking means for checking authenticity of the data stored in the data server.

19. The server according to claim 18, wherein said checking means checks authenticity by comparing data which are associated with an identical storage request and are stored in the data servers.

20. The server according to claim 18, wherein said checking means checks if data becomes fraudulent due to a memory medium.

21. The server according to claim 18, wherein said checking means checks if data becomes fraudulent due to tampering of data.

22. The server according to claim 21, wherein when said checking means determines that the data becomes fraudulent due to tampering of data, said checking means sends a message indicating this to a client terminal that issued the storage request of the data.

23. The server according to claim 11, further comprising authentication means for authenticating if the user who issued the storage request is a member who subscribes to the service, and accepts only the storage request from the user authenticated by said authentication means.

24. The server according to claim 11, further comprising authentication means for checking authenticity of the data server selected by said select means, and said sending means sends data in only the data servers authenticated by said authentication means.

25. The server according to claim 11, further comprising notify means for sending at least various storage condition data associated with a data storage process to a client terminal that issued the storage request.

26. The server according to claim 25, wherein said notify means sends encryption algorithm and key data in addition to storage location data of the data associated with the storage request as the storage condition data.

27. The server according to claim 25, wherein the client device includes storage means for storing at least the storage condition data sent from said notify means.

28. The method according to claim 1, wherein the server automatically selects the data servers based on the user's service subscription qualification level in the select step.

29. The system according to claim 10, wherein said select means automatically selects the data servers based on the user's service subscription qualification level.

30. The computer program according to claim 9, wherein said select means automatically selects the data servers based on the user's service subscription qualification level.

* * * * *